(12) United States Patent
Coimbra et al.

(10) Patent No.: US 12,475,185 B2
(45) Date of Patent: *Nov. 18, 2025

(54) SECURE DIGITAL ASSISTANT INTEGRATION IN WEB PAGES

(71) Applicant: GOOGLE LLC, Mountain View, CA (US)

(72) Inventors: Adam Coimbra, Los Altos, CA (US); Nikhil Rao, Santa Clara, CA (US); Hao Wu, Mountain View, CA (US); Ian Baker, San Francisco, CA (US); Anshul Gupta, San Francisco, CA (US); Jay Akkad, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 18/384,342

(22) Filed: Oct. 26, 2023

(65) Prior Publication Data

US 2024/0054169 A1    Feb. 15, 2024

Related U.S. Application Data

(63) Continuation of application No. 17/837,914, filed on Jun. 10, 2022, now Pat. No. 11,829,435, which is a
(Continued)

(51) Int. Cl.
*G06F 21/00*    (2013.01)
*G06F 3/16*    (2006.01)
(Continued)

(52) U.S. Cl.
CPC ............ *G06F 16/957* (2019.01); *G06F 3/167* (2013.01); *G06F 9/44589* (2013.01);
(Continued)

(58) Field of Classification Search
CPC .......... G06F 9/453; G06F 9/54; G06F 16/954; G06F 16/957; G06F 21/44
See application file for complete search history.

(56) References Cited

U.S. PATENT DOCUMENTS 9,785,759 B1    10/2017  Dorwin et al.
11,361,066 B2    6/2022  Coimbra et al.
(Continued)

FOREIGN PATENT DOCUMENTS

CN    108541312    9/2018
WO    2020226616    11/2020

OTHER PUBLICATIONS

European Patent Office; Communication issued in Application No. 23170455.2; 11 pages; dated Jul. 27, 2023.
(Continued)

*Primary Examiner* — Rodman Alexander Mahmoudi
(74) *Attorney, Agent, or Firm* — Gray Ice Higdon

(57) ABSTRACT

Secure digital assistant integration with web pages is provided. The system receives an intent manifest data structure that maps actions of a digital assistant with link templates of an electronic resource developed by a third-party developer device. The system validates the electronic resource based on the intent manifest data structure. The system receives, from a data exchange component of an iframe of the electronic resource loaded by a client computing device, an identifier of the client computing device. The system receives a foreground state of the electronic resource from an onsite state sharing API. The system selects a data value for a parameter based on the foreground state and the intent manifest data structure. The system provides the data value. An authorization component generates an authorization
(Continued)

prompt, receives input, and transmits the data value to an onsite intent execution API of the electronic resource to execute an action.

20 Claims, 4 Drawing Sheets

Related U.S. Application Data continuation of application No. 16/466,213, filed as application No. PCT/US2019/030919 on May 6, 2019, now Pat. No. 11,361,066.

(51) Int. Cl.
    *G06F 9/445*    (2018.01)
    *G06F 9/451*    (2018.01)
    *G06F 9/46*    (2006.01)
    *G06F 9/54*    (2006.01)
    *G06F 16/903*    (2019.01)
    *G06F 16/954*    (2019.01)
    *G06F 16/957*    (2019.01)
    *G06F 16/958*    (2019.01)
    *G06F 21/44*    (2013.01)
    *G10L 15/30*    (2013.01)
    *H04L 9/40*    (2022.01)

(52) U.S. Cl.
    CPC .............. *G06F 9/453* (2018.02); *G06F 9/468* (2013.01); *G06F 9/54* (2013.01); *G06F 16/90335* (2019.01); *G06F 16/954* (2019.01); *G06F 16/986* (2019.01); *G06F 21/44* (2013.01); *G10L 15/30* (2013.01); *H04L 63/0421* (2013.01)

(56) References Cited

U.S. PATENT DOCUMENTS

| | | | |
|---|---|---|---|
| 11,963,006 B2 * | 4/2024 | Avetisov | ................. H04L 63/20 |
| 2011/0301982 A1 | 12/2011 | Green, Jr. et al. | |
| 2012/0084835 A1 | 4/2012 | Thomas | |
| 2014/0108792 A1 | 4/2014 | Borzycki | |
| 2016/0191645 A1 | 6/2016 | Hayton | |
| 2016/0284005 A1 | 9/2016 | Daniel et al. | |
| 2018/0260086 A1 | 9/2018 | Leme et al. | |
| 2021/0258308 A1 * | 8/2021 | Avetisov | ............... H04L 9/0825 |
| 2021/0326430 A1 | 10/2021 | Coimbra et al. | |
| 2022/0300600 A1 | 9/2022 | Coimbra et al. | |

OTHER PUBLICATIONS

European Patent Office; Intention to Grant issued in Application No. 19725488; 80 pages; dated Dec. 23, 2022.
International Search Report and Written Opinion on Application No. PCT/US2019/030919; 26 pages; dated Jul. 11, 2019.
Fillr, "Autofill for the Mobile Web", Dec. 31, 2017 (Dec. 31, 2017), Retrieved from the Internet: URL:https://web.archive.org/web/20180705142038if_/https://static1.squarespace.com/static/54cb10c3e4b0a44a770927e8/t/597e8c36d482e9f4cc7f4da1/1501465667278/Tech_Whitepaper.pdf XP055600467 [retrieved on Jun. 28, 2019].
Intellectual Property India; Examination Report issued in Application No. IN202127038112; 6 pages; dated Mar. 9, 2022.
China National Intellectual Property Administration; Notification of First Office Action issued in Application No. 201980002168.7; 16 pages; dated Jul. 31, 2024.
Intellectual Property India; Hearing Notice issued in Application No. IN202127038112; 3 pages; dated May 15, 2024.
China National Intellectual Property Administration; Notice of Grant issued in Application No. 201980002168.7; 4 pages; dated May 8, 2025.
European Patent Office; Communication pursuant to Article 94(3) EPC issued in Application No. 23170455.2; 7 pages; dated Sep. 1, 2025.

* cited by examiner

SECURE DIGITAL ASSISTANT INTEGRATION IN WEB PAGES

BACKGROUND

Applications can be installed on a computing device. The computing device can execute the application. The application can present digital content.

SUMMARY

At least one aspect is directed to a system for secure digital assistant integration with web pages. The system can include a data processing system having one or more processors and memory. The data processing system can receive, from a third-party developer device, an intent manifest data structure containing a mapping between a plurality of actions of a digital assistant and a plurality of link templates of an electronic resource developed by the third-party developer device. The data processing system can validate, via a validation policy, the electronic resource based on the intent manifest data structure. The data processing system can receive, from a data exchange component of an iframe of the electronic resource loaded by a client computing device, an identifier of the client computing device that executes the electronic resource. The data processing system can query an onsite state sharing application programming interface of the electronic resource. The data processing system can receive, responsive to the query, a foreground state of the electronic resource from the onsite state sharing application programming interface. The data processing system can determine a parameter based on the foreground state and the intent manifest data structure. The data processing system select, from a data repository, a data value for the parameter based on the identifier of the client computing device. The data processing system can provide, to an authorization component of the iframe of the electronic resource loaded on the client computing device, the data value. The data processing system can provide the data value to cause the authorization component to perform one or more functions. The authorization component can generate an authorization prompt. The authorization component can receive, responsive to the authorization prompt, input from the client computing device. The authorization component can transmit, responsive to authorization of the data value, the data value to an onsite intent execution application programming interface of the electronic resource. The onsite intent execution application programming interface can cause the electronic resource to execute an action of the plurality of actions with the data value.

The data exchange component can restrict the electronic resource in a parent frame from accessing the identifier of the client computing device. The third-party developer device that developed the electronic resource can be prohibited from accessing the identifier of the client computing device.

The data processing system can authorize the data exchange component to load in the iframe of the electronic resource responsive to validation of the electronic resource via the validation policy.

The data processing system can validate the electronic resource based on a trusted site list.

The data processing system can receive a request from the data exchange component executed by the client computing device. The data processing system can query the onsite state sharing application programming interface of the electronic resource responsive to the request.

The data processing system can receive, from a voice navigator and response component executed by the client computing device, data packets carrying an input audio signal detected by a sensor of the client computing device. The data processing system can identify, from the data packets, a request for a candidate data value. The data processing system can provide the data value as the candidate data value responsive to the request.

The data processing system can provide the data value to the onsite intent execution application programming interface to cause the onsite intent execution application programming interface to input the data value into an input text box of the electronic resource.

The data processing system can determine, based on the foreground state, a plurality of parameters used to execute the action provided by the electronic resource. The data processing system can select, based on the identifier of the client computing device, a plurality of data values corresponding to the plurality of parameters. The data processing system can provide the plurality of data values to the authorization component to cause the authorization component to provide, to the onsite intent execution application programming interface. The onsite intent execution application programming interface can be configured to use the plurality of data values to bypass one or more states used by the electronic resource to execute the action.

The data processing system can determine, based on the foreground state and the intent manifest data structure, one or more subsequent states of the electronic resource. The data processing system can determine, based on the one or more subsequent states, one or more parameters. The data processing system can select, based on the identifier, one more data values for the one or more parameters prior to the electronic resource entering the one or more subsequent states.

The data processing system can provide, prior to the electronic resource requesting the data value, the data value for authorization by the authorization component and input to the onsite intent execution application programming interface.

The data processing system can provide the data value to the client computing device to cause the client computing device to build a deep link with the data value, and load the deep link in a web browser executed by the client computing device. The electronic resource can be or include a web page.

The data processing system can build a link with the data value based on a link template of the plurality of link templates that maps to the action of the plurality of actions. The data processing system can provide, via the data exchange component, the link to the onsite intent execution application programming interface.

At least one aspect is directed to a method for secure digital assistant integration with web pages. The method can be performed by a data processing system having at least one processor. The method can include the data processing system receiving, from a third-party developer device, an intent manifest data structure containing a mapping between a plurality of actions of a digital assistant and a plurality of link templates of an electronic resource developed by the third-party developer device. The method can include the data processing system validating, via a validation policy, the electronic resource based on the intent manifest data structure. The method can include the data processing system receiving, from a data exchange component of an iframe of the electronic resource loaded by a client computing device, an identifier of the client computing device that executes the electronic resource. The method can include the data processing system querying an onsite state sharing application programming interface of the electronic resource. The method can include the data processing system receiving, responsive to the query, a foreground state of the electronic resource from the onsite state sharing application programming interface. The method can include the data processing system determining a parameter based on the foreground state and the intent manifest data structure. The method can include the data processing system selecting, from a data repository, a data value for the parameter based on the identifier of the client computing device. The method can include the data processing system providing, to an authorization component of the iframe of the electronic resource loaded on the client computing device, the data value to cause the authorization component to: generate an authorization prompt; receive, responsive to the authorization prompt, input from the client computing device; and transmit, responsive to authorization of the data value, the data value to an onsite intent execution application programming interface of the electronic resource to cause the electronic resource to execute an action of the plurality of actions with the data value.

At least one aspect is directed to a computer program product that, when implemented on a data processing system, is configured to cause the data processing system to perform the method of securely integrating digital assistants with web pages.

The individual features and/or combinations of features defined above in accordance with any aspect of this disclosure or below in relation to any specific embodiment of the disclosure may be utilized, either separately and individually, alone or in combination with any other defined feature, in any other aspect or embodiment of the disclosure.

Furthermore, this disclosure is intended to cover apparatus configured to perform any feature described herein in relation to a method and/or a method of using or producing, using or manufacturing any apparatus feature described herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
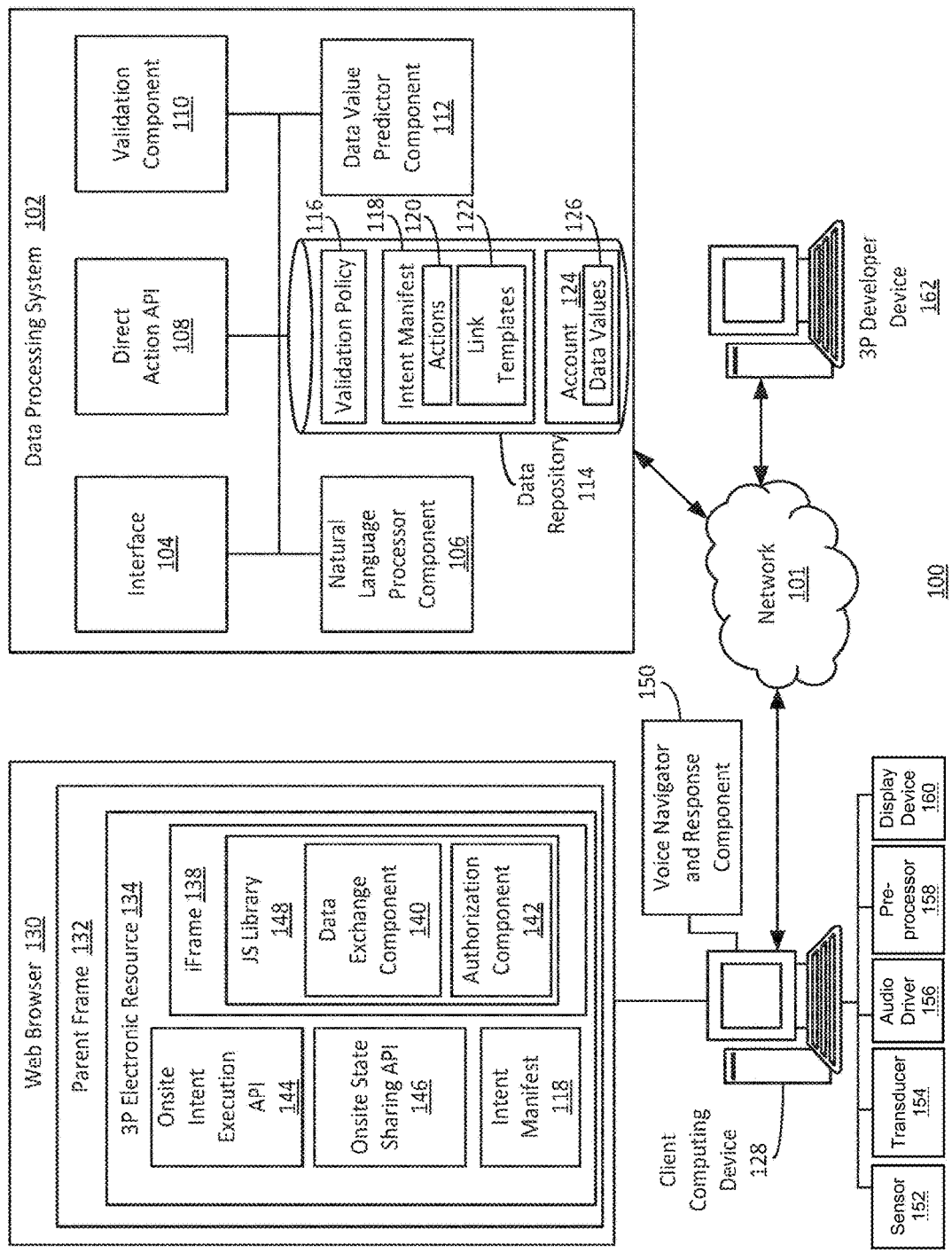
FIG. 1 is an illustration of an example system for secure digital assistant integration with web pages.

Following below are more detailed descriptions of various concepts related to, and implementations of, methods, apparatuses, and systems for secure digital assistant integration with web pages. The various concepts introduced above and discussed in greater detail below may be implemented in any of numerous ways.

This disclosure is generally directed to secure digital assistant integration with web pages, electronic documents, or other electronic resources. A client computing device can render or load a web page. The web page can include input fields or provide prompts for input. The input can be provided by a user of the web page. The input can include information associated with the user, such as a username, password, account information, electronic transaction information, or preference information. However, the user may not have access to the data to be provided for input to the mobile device. Further, the client computing device may have a limited user interface or input capabilities to receive input from a user. The web page may operate in a sandboxed or restricted computing environment in which the web page is prevented from accessing parts of memory on the client computing device, or a server containing account information. As web pages are increasingly accessed or rendered on client computing devices, and third party developers increasingly request input data values to execute actions or perform services, it can be challenging to provide such input for web pages or integrate with a digital assistant while maintaining secure communication due to the limited input interfaces on mobile devices, inefficiencies associated with providing input via the limited input interfaces, or the inability to readily access the input information.

The technical solution of this disclosure is directed to securely integrating a digital assistant with electronic resources such as electronic documents or web pages. The technical solution can allow data transfer between electronic resources and a server and can enable input to be provided to the electronic resources so as to provide improved user input. The data transfer can provide capabilities such as identification, electronic transaction processing, customization, or contextual information to third party electronic resources to facilitate user input and improve the processing flow while maintaining security throughout the system.

To securely integrate a digital assistant with a third party electronic resource, systems and methods of this technical solution include one or more application programming interfaces ("API") for third party electronic resource developers to integrate with a digital assistant, a JavaScript library that securely hosts digital assistant functionality on a third party electronic resource, a contextual suggestions system integrated with the APIs and the JavaScript library, and a voice navigation and response system integrated with the APIs and the JavaScript library.

The API interface of the technical solution can include or be associated with an intent manifest, an onsite intent execution API, and an onsite state sharing API. The intent manifest can refer to or include a data file provided by the third party web developer that declares mappings between digital assistant intents and uniform resource locator ("URL") templates of the electronic resource. An intent can refer to or include a messaging object that describes how the digital assistant or other system is to perform an action. The intent can refer to, include, or define an action object. The intent can be mapped to a link (e.g., a URL) that fulfills the action.

The onsite intent execution API can include a JavaScript callback implemented by the third party developer for the electronic resource to process a digital assistant intent triggered by a data processing system or client computing device. This technical solution can use JavaScript to execute intents because execution of the intent via a link or URL may be technically challenging or unavailable. For example, execution via a link or URL may be difficult or not possible if the links are not declared in the intent manifest. Links may not be published in the intent manifest due to errors, bugs, or faults in the intent manifest. Links may not be published in the intent manifest due to the third party developer choosing not to publish the links. Links may not be published in the intent manifest if they are not global links or links that are globally accessible. Execution via a link may degrade the user experience or create a sub-optimal user experience because it may cause the web browser or other application to reload the web page. Execution via a link may consume greater computing resources such as network bandwidth usage, processor utilization, or memory utilization because it may result in requesting the full web page from a server via a network, and then reloading the entire webpage. JavaScript execution of intents or actions can provide improved efficiency relative to execution via a URL link due to not reloading the page and allowing execution in the absence of a globally accessible or published link.

The onsite state sharing API can include or provide a JavaScript callback. A callback can refer to or include a function that is executed after another function has finished executing. The onsite state sharing API can be implemented by the third party developer for the site to publish the foreground state when requested by a data processing system. The data processing system can query or request the foreground state from the onsite state sharing API. Responsive to the request, the onsite state sharing API can provide the foreground state. The foreground state can refer to the present semantic state of the electronic resource, such as what is being displayed on the web page or what functions or actions are being performed or available. The state can include one or more entities representing a real-world or physical concept in the foreground of the electronic resource as structured data. An entity can refer to a person, place or thing. The entity can have a unique identifier. The entity can include a property, type and description. Entities can include a relationship to one or more other entities. Entities can provide a structure to data. The state can include one or more digital assistant intents that are transiently available in the current context of the electronic resource.

The JavaScript library of this technical solution can safely and securely host the digital assistant functionality as an overlay rendered on the third party electronic resource with the ability to provide interactions and authenticated callbacks to a data processing system in a manner opaque to the third party electronic resource. The JavaScript library of the present technical solution can provide a secure communication because the third party electronic resource can be prohibited or prevented from accessing the data associated with the JavaScript library or communications with the data processing system prior to authorization. The secure provision of such data values can reduce processor, memory or battery consumption of the computing device by reducing the amount of delay caused by inputting data values or launching additional applications on the computing device to obtain the data values.

The data processing system of this technical solution can include a data value predictor component (or a context autofill suggestion system) that accepts as input the foreground state. The data processing system can receive the foreground state from the JavaScript library, which receives the foreground state from the onsite state sharing API of the third party electronic resource. The foreground state can indicate or identify the current intent associated with the electronic resource. The data processing system, using the foreground state information, can search a data repository or database linked with the client computing device (or account thereof) that renders the electronic resource. The data processing system can search the database to select or predict data values for the parameters of the current intent. If the data processing system identifies a selection for the parameters or an acceptable prediction, the data processing system can provide the value to the JavaScript library. The JavaScript library can present the data value for authorization. If the data value is authorized, the data value can be provided or passed to the electronic resource. The JavaScript library can provide the authorized data value to the third party electronic resource through a link (e.g., a URL deep link) or a JavaScript intent execution API.

For example, the electronic resource can include a car rental website. The data processing system can identify the current foreground state that indicates an intent of book_car_rental(to_location, from_location, start_time, end_time). The data processing system can search and identify data about an upcoming flight reservation stored in a database associated with an account corresponding to the client computing device rendering the third party electronic resource. The data processing system can predict data values for the intent parameters based on the data in the database. The data processing system can transmit the predicted data values for the parameters to the client computing device. The data processing system can execute an action corresponding to the intent on the third party electronic website responsive to authorization.

This technical solution can include a voice navigation and responding system (e.g., a voice navigator and response component or digital assistant component). The data processing system can invoke the voice navigator and response component when the data processing system, via a natural language processing component, provides a structured intent parse that can be handled by a third party electronic resource integrating with the digital assistant interface and JavaScript library. The technology can translate the user intent parse into a URL link or JavaScript digital assistant intent execution call, which can be used to navigate the electronic resource. After the JavaScript library executes an intent on the third party electronic resource, the JavaScript library can request the foreground state from the JavaScript callback of the electronic resource. The voice navigator and response component, or data processing system, can match the foreground state data with a voice response (text-to-speech) template that has been pre-associated with the matched user intent. The voice navigator and response component can render the text-to-speech response to the user by passing the state data into the template. This technology can allow the user to voice-navigate throughout a website and hear a text-to-speech ("TTS") answer after each voice navigation such that a mechanism enabling user input may be provided.

FIG. 1 illustrates an example system 100 for secure digital assistant integration in web pages. The system 100 can include content selection infrastructure. The system 100 can include application delivery infrastructure. The system 100 can include an online application store or marketplace. The system 100 can include a data processing system 102. The data processing system 102 can communicate with one or more of an third-party ("3P") developer device 162 (or application developer device) or a client computing device 128 (or client device or computing device) via network 101. The system 100 can also communicate with other devices, such as third-party devices, content provider devices, or digital surface devices.

The network 101 can include computer networks such as the Internet, local, wide, metro, or other area networks, intranets, satellite networks, and other communication networks such as voice or data mobile telephone networks. The network 101 can be used to access information resources such as web pages, web sites, domain names, or uniform resource locators that can be presented, output, rendered, or displayed on at least one client computing device 128, such as a laptop, desktop, tablet, digital assistant device, smart phone, wearable device, portable computers, or speaker. For example, via the network 101 a user of the client computing device 128 can access information or data provided by the data processing system 102 or 3P developer device 162.

The network 101 can include or constitute a display network, e.g., a subset of information resources available on the internet that are associated with a content placement or search engine results system, or that are eligible to include third party digital components as part of a digital component placement campaign. The network 101 can be used by the data processing system 102 to access information resources such as web pages, web sites, domain names, or uniform resource locators that can be presented, output, rendered, or displayed by the client computing device 128. For example, via the network 101 a user of the client computing device 128 can access information or data provided by the data processing system 102 or the 3P developer device 162.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 101, for example with the client computing device 128 or the 3P developer device 162 or other networked device or third-party device. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one 3P developer device 162. The 3P developer device 162 can include at least one logic device such as a computing device having a processor to communicate via the network 101, for example with the client computing device 128, or the data processing system 102. The 3P developer device 162 can include at least one computation resource, server, processor or memory. For example, 3P developer device 162 can include a plurality of computation resources or servers located in at least one data center.

The 3P developer device 162 can provide audio based digital components for presentation or display by the client computing device 128 as an audio output digital component. The digital component can include an offer for a good or service, such as a voice based message that states: "Would you like me to order you a taxi?" For example, the 3P developer device 162 can include memory to store a series of audio digital components that can be provided in response to a voice based query. The 3P developer device 162 can also provide audio based digital components (or other digital components) to the data processing system 102 where they can be stored in the data repository 114. The data processing system 102 can select the audio digital components and provide (or instruct the 3P developer device 162 to provide) the audio digital components to the client computing device 128. The audio based digital components can be exclusively audio or can be combined with text, image, or video data.

The 3P developer device 162 can include, interface with, or otherwise communicate with the data processing system 102. The 3P developer device 162 can include, interface, or otherwise communicate with the client computing device 128. The 3P developer device 162 can include, interface, or otherwise communicate with the client computing device 128, which can be a mobile computing device. The 3P developer device 162 can include, interface, or otherwise communicate with the 3P developer device 162. For example, the 3P developer device 162 can provide a digital component to the client computing device 128 for execution by the client computing device 128. The 3P developer device 162 can provide the digital component to the data processing system 102 for storage by the data processing system 102. The 3P developer device 162 can provide rules or parameters relating to the digital component to the data processing system 102.

The client computing device 128 can download an electronic resource, electronic document or application developed by the 3P developer device 162. The client computing device 128 can download the application or electronic resource from the data processing system 102 via the network 101. The client computing device 128 can load the electronic document or resource. The client computing device 128 can execute the application. The client computing device 128 can execute, launch, trigger or otherwise access or use the application responsive to a user input or trigger event or condition. The application can include a front-end component and a back-end component. The client computing device 128 can execute or provide the front-end component of the application, while the data processing system 102 or 3P developer device 162 provides a back-end component of the application.

The client computing device 128 can include, interface, or otherwise communicate with at least one sensor 152, transducer 154, audio driver 156, or pre-processor 158. The client computing device 128 can include a display device 160, such as a light indicator, light emitting diode ("LED"), organic light emitting diode ("OLED"), or other visual indicator configured to provide a visual or optic output. The sensor 152 can include, for example, an ambient light sensor, proximity sensor, temperature sensor, accelerometer, gyroscope, motion detector, GPS sensor, location sensor, microphone, or touch sensor. The transducer 154 can include a speaker or a microphone. The audio driver 156 can provide a software interface to the hardware transducer 154. The audio driver can execute the audio file or other instructions provided by the data processing system 102 to control the transducer 154 to generate a corresponding acoustic wave or sound wave. The pre-processor 158 can include a processing unit having hardware configured to detect a keyword and perform an action based on the keyword. The pre-processor 158 can filter out one or more terms or modify the terms prior to transmitting the terms to the data processing system 102 for further processing. The pre-processor 158 can convert the analog audio signals detected by the microphone into a digital audio signal, and transmit one or more data packets carrying the digital audio signal to the data processing system 102 via the network 101. In some cases, the pre-processor 158 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 128 can be associated with an end user that enters voice queries as audio input into the client computing device 128 (via the sensor 152) and receives audio output in the form of a computer generated voice that can be provided from the data processing system 102 (or the 3P developer device 162) to the client computing device 128, output from the transducer 154 (e.g., a speaker). The computer generated voice can include recordings from a real person or computer generated language.

The client computing device 128 (or computing device, or client device, or digital device) may or may not include a display. For example, the computing device may include limited types of user interfaces, such as a microphone and speaker. In some cases, the primary user interface of the client computing device 128 may be a microphone and speaker, or voice interface. For example, the primary user interface of the client computing device 128 can include a voice-based or audio-based user interface. The client computing device 128 can include a display and have the primary user interface be voice-based or audio-based. The primary user interface of the client computing device 128 can be conversational. A conversational user interface can refer to a user interface that is at least in part driven or facilitated by a natural language processor component 106 of the data processing system 102.

The data processing system 102 can include a content placement system having at least one computation resource or server. The data processing system 102 can include, interface, or otherwise communicate with at least one interface 104. The data processing system 102 can include, interface, or otherwise communicate with at least one natural language processor component 106. The data processing system 102 can include, interface, or otherwise communicate with at least one direct action application programming interface ("API") 108. The interface 104, natural language processing component 106 and direct action API 108 can provide a conversational API or digital assistant functionality. The conversational API or digital assistant can communicate or interface with one or more voice-based interfaces or various digital assistant devices or surfaces in order to provide data or receive data or perform other functionality.

The data processing system 102 can include, interface, or otherwise communicate with at least one validation component 110. The data processing system 102 can include, interface, or otherwise communicate with at least one data value predictor component 112. The data processing system 102 can include, interface, or otherwise communicate with at least one data repository 114.

The interface 104, natural language processor component 106, direct action API 108, validation component 110, and data value predictor component 112 can each include at least one processing unit or other logic device such as programmable logic array engine, or module configured to communicate with the data repository 114 or database. The interface 104, natural language processor component 106, direct action API 108, validation component 110, data value predictor component 112, and data repository 114 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of client computing devices 128 (or computing device or digital assistant device). A user of a client computing device 128 or mobile computing device can affirmatively authorize the data processing system 102 to obtain network activity information corresponding to the client computing device 128 or mobile computing device. For example, the data processing system 102 can prompt the user of the client computing device 128 for consent to obtain one or more types of network activity information. The client computing device 128 can include a mobile computing device, such as a smartphone, tablet, smartwatch, or wearable device. The identity of the user of the client computing device 128 can remain anonymous and the client computing device 128 can be associated with a unique identifier (e.g., a unique identifier for the user or the computing device provided by the data processing system 102 or a user of the client computing device 128). The data processing system 102 can associate each observation with a corresponding unique identifier.

The data processing system 102 can interface with a 3P developer device 162. The 3P developer device 162 can include or refer to a device of a content provider. The content provider can establish an electronic content campaign. The electronic content campaign can be stored as content data in the data repository 114. An electronic content campaign can refer to one or more content groups that correspond to a common theme. A content campaign can include a hierarchical data structure that includes content groups, digital component data objects, and content selection criteria. To create a content campaign, the content provider can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the client computing device 128. In some cases, an impression can refer to a viewable or audible impression; e.g., the digital component object is at least partially (e.g., 20%, 30%, 30%, 40%, 50%, 60%, 70%, or more) viewable on a display device 160 of the client computing device 128, or audible via a speaker of the client computing device 128. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider can provide one or more keywords to be used by the data processing system 102 to select a digital component object provided by the content provider. The content provider can identify one or more keywords to bid on, and further provide bid amounts for various keywords. The content provider can provide additional content selection criteria to be used by the data processing system 102 to select digital component objects. Multiple content providers can bid on the same or different keywords, and the data processing system 102 can run a content selection process or ad auction responsive to receiving an indication of a keyword of an electronic message.

The content provider can provide one or more digital component objects for selection by the data processing system 102. The data processing system 102 can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. A digital component object (or digital component) can include, for example, a content item, an online document, audio, images, video, multimedia content, or sponsored content. Upon selecting a digital component, the data processing system 102 can transmit the digital component object for rendering on a computing device 128 or display device 160 of the client computing device 128. Rendering can include displaying the digital component on a display device, or playing the digital component via a speaker of the client computing device 128. The data processing system 102 can provide instructions to a computing device 128 to render the digital component object. The data processing system 102 can instruct the client computing device 128, or an audio driver 156 of the client computing device 128, to generate audio signals or acoustic waves.

The data repository 114 can include one or more local or distributed databases, and can include a database management system. The data repository 114 can include computer data storage or memory and can store one or more of validation policies 116, intent manifests 118, actions 120, link templates 122, account information 124 and data values 126, among other data. The data repository 114 can store the one or more of validation policies 116, intent manifests 118, actions 120, link templates 122, account information 124 and data values 126 in one or more data structures, databases, data files, indexes, or other type of data storage.

The data repository 114 can store an intent manifest 118. The intent manifest 118 can be provided by a 3P developer device 162. The intent manifest 118 can be configured for an electronic resource. The intent manifest 118 can be specific for an electronic resource, such as a website, web page, or other electronic document. The intent manifest 118 can include a data file or data structure. The intent manifest 118 can include actions 120 and link templates 122. The intent manifest 118 can map actions 120 to link templates 122. The intent manifest 118 can link, tie, associate, or otherwise relate actions 120 to link templates 122. The intent manifest data structure 118 can be in a format such as a JavaScript object format having JavaScript object properties such as name/value pairs.

An actions 120 can refer to or include an intent. An action 120 can refer to or include a function to be performed on or via the electronic resource. An action 120 can be a messaging object that describes how the system is to perform a task or function. The action 120 can be used to facilitate fulfillment of the action or to request fulfillment of the action by the system or 3P developer device 162. The action 120 can be defined in an action package that includes the name of the action 120 or intent and an indication of the user queries that match the intent. The user queries can correspond to link templates 122.

Link templates 122 can include a template with placeholders for data values of parameters. The data processing system 102 can use the link template 122 to build a link. A link can refer to a URL or other reference or pointer to an electronic resource. The link template 122 can be referred to as a urlTemplate. An example link template 122 can be: https://m_taxiapp_com/?action=setPickup{&pickup[latitude],pickup[longitude],pickup[nickname],pickup[formatted_address],dropoff[latitude],dropoff[longitude],dropoff[nickname],dropoff[formatted_address]}. In this example, the link template includes placeholders for parameter values that are indicated using square brackets "[ ]." The link can include one or more parameters. The link can include a domain of an electronic resource, an action to be performed, and the parameters used to perform the action. Thus, the intent manifest 118 can map actions to link templates 122 that can be used to fulfill the action.

The data repository 114 can store a validation policy 116 in a data file, data structure, or other storage format. The validation policy 116 can include one or more rules, policies, logic, thresholds, comparisons, or functions used by at least the validation component 110 to validate an intent manifest 118 for an electronic resource provided by a 3P developer device 162. Upon validation of the intent manifest by the validation component 110 using a validation policy 116, the data processing system 102 can store the intent manifest 118 in the data repository 114. An example of a validation policy 116 can include determining whether the intent manifest 118 includes determining the format of the action or the link template, and approving the intent manifest if the format matches a predetermined format indicated in the validation policy 116.

The data repository 114 can store one or more accounts 124. Accounts 124 can include account information. An account 124 can be associated with or for a user of a computing device 128. The account 124 can include, store, or otherwise indicate or provide information or data values 126 associated with a user of the client computing device 128. The user of the client computing device 128 can establish the account 124 with the data processing system 102. The account 124 can include any electronic or digital account. The account 124 can include profile information, historical information, or other data values 126 associated with the user of the client computing device 128. The account 124 can include information previously provided by the client computing device 128 to the data processing system 102. Data values 126 can include, for example, information an electronic account information, identifiers, address information, or preferences. The data values 126 can include information associated with a user that can be used to facilitate a transaction flow on a 3P electronic resource 134, or information that can be input into an input form or text box in a 3P electronic resource 134.

The data processing system 102 can include an interface 104 (or interface component) designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can communicate with one or more of the client computing device 128, or 3P developer device 162 via network 101.

The data processing system 102 can interface with an application, script or program installed at the client computing device 128, such as an app to communicate input audio signals to the interface 104 of the data processing system 102 and to drive components of the local client computing device to render output audio signals. The data processing system 102 can receive data packets or other signal that includes or identifies an audio input signal. The interface 104 can interface or communicate with one or more components of the client computing device 128. The interface 104 can communicate with, for example, a web browser 130, JavaScript library 148, onsite state sharing API, or a data exchange component 140 of the client computing device 128, or an authentication component 142 of the client computing device 128.

The data processing system 102 can include a natural language processor ("NLP") component 106. For example, the data processing system 102 can execute or run the NLP component 106 to receive or obtain the audio signal and parse the audio signal. For example, the NLP component 106 can provide for interactions between a human and a computer. The NLP component 106 can be configured with techniques for understanding natural language and allowing the data processing system 102 to derive meaning from human or natural language input. The NLP component 106 can include or be configured with technique based on machine learning, such as statistical machine learning. The NLP component 106 can utilize decision trees, statistical models, or probabilistic models to parse the input audio signal. The NLP component 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 106 can convert the audio input signal into recognized text by comparing the input signal against a stored, representative set of audio waveforms (e.g., in the data repository 114) and choosing the closest matches. The set of audio waveforms can be stored in data repository 114 or other database accessible to the data processing system 102. The representative waveforms are generated across a large set of users, and then may be augmented with speech samples from the user. After the audio signal is converted into recognized text, the NLP component 106 matches the text to words that are associated, for example via training across users or through manual specification, with actions that the data processing system 102 can serve. Aspects or functionality of the NLP component 106 can be performed by the data processing system 102 or the client computing device 128. For example, a local NLP component can execute on the client computing device 128 to perform aspects of converting the input audio signal to text and transmitting the text via data packets to the data processing system 102 for further natural language processing.

The audio input signal can be detected by the sensor 152 or transducer 154 (e.g., a microphone) of the client computing device 128. Via the transducer 154, the audio driver 156, or other components the client computing device 128 can provide the audio input signal to the data processing system 102 (e.g., via the network 101) where it can be received (e.g., by the interface 104) and provided to the NLP component 106 or stored in the data repository 114. The audio input signal detected by the sensor 152 can include an initial keyword, hotword, or trigger word that indicates to the client computing device 128 that the input audio signal is to be transmitted to the data processing system 102.

The client computing device 128 can include an audio driver 156, a transducer 154, a sensor 152 and a pre-processor component 158. The sensor 152 can receive or detect an input audio signal (e.g., voice input). The pre-processor component 158 can be coupled to the audio driver, the transducer, and the sensor. The pre-processor component 158 can identify an initial keyword, hotword, trigger keyword or other symbol in the input audio signal that indicates that the input audio signal is to be transmitted to the data processing system 102 for processing by the NLP component 106. The pre-processor component 158 can filter the input audio signal to create a filtered input audio signal (e.g., by removing certain frequencies or suppressing noise, or removing the initial keyword or hotword). The pre-processor component 158 can convert the filtered input audio signal to data packets (e.g., using a software or hardware digital-to-analog converter). In some cases, the pre-processor component 158 can convert the unfiltered input audio signal to data packets and transmit the data packets to the data processing system 102. The pre-processor component 158 can transmit the data packets to a data processing system 102 comprising one or more processors and memory that execute a natural language processor component, an interface, a speaker recognition component, and a direct action application programming interface.

The data processing system 102 can receive, via the interface, from the pre-processor component 158, the data packets comprising the filtered (or unfiltered) input audio signal detected by the sensor. The data processing system 102 can identify an acoustic signature from the input audio signal. The data processing system 102 can identify, based on a lookup in a data repository (e.g., querying a database), an electronic account 124 corresponding to the acoustic signature. The data processing system 102 can establish, responsive to identification of the electronic account 124, a session and an account for use in the session. The account 124 can include a profile having one or more policies. The data processing system 102 can parse the input audio signal to identify a request and a trigger keyword corresponding to the request.

The data processing system 102 can provide, to the pre-processor component 158 of the client computing device 128, a status. The client computing device 128 can receive the indication of the status. The audio driver can receive the indication of the status of the profile, and generate an output signal based on the indication. The audio driver can convert the indication to an output signal, such as sound signal, or acoustic output signal. The audio driver can drive the transducer 154 (e.g., speaker) to generate sound based on the output signal generated by the audio drive.

In some cases, the client computing device 128 can include a display device 160. The display device 160 can include one or more LEDs, lights, display, or other component or device configured to provide an optical or visual output. The pre-processor component 158 can cause the light source to provide a visual indication corresponding to the status. For example, the visual indication can be a status indicator light that turns on, a change in color of the light, a light pattern with one or more colors, or a visual display of text or images.

The NLP component 106 can obtain the input audio signal. From the input audio signal, the NLP component 106 can identify at least one request or at least one trigger keyword corresponding to the request. The request can indicate intent or subject matter of the input audio signal. The trigger keyword can indicate a type of action likely to be taken. The trigger keyword can be a wakeup signal or hotword that indicates to the client computing device 128 to convert the subsequent audio input into text and transmit the text to data processing system 102 for further processing. For example, the NLP component 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 106 can parse the input audio signal to identify, determine, retrieve, or otherwise obtain the request and the trigger keyword. For instance, the NLP component 106 can apply a semantic processing technique to the input audio signal to identify the trigger keyword or the request. The NLP component 106 can apply the semantic processing technique to the input audio signal to identify a trigger phrase that includes one or more trigger keywords, such as a first trigger keyword and a second trigger keyword. For example, the input audio signal can include the sentence "I want a ride to the airport." The NLP component 106 can apply a semantic processing technique, or other natural language processing technique, to the data packets comprising the sentence to identify the request or trigger phrases "want a ride" and "airport". The NLP component 106 can further identify multiple trigger keywords, such as want and ride. For example, the NLP component 106 can determine that the trigger phrase includes the trigger keyword and a second trigger keyword.

The NLP component 106 can filter the input audio signal to identify the trigger keyword. For example, the data packets carrying the input audio signal can include "It would be great if I could get someone that could help me go to the airport", in which case the NLP component 106 can filter out one or more terms as follows: "it", "would", "be", "great", "if", "could", "get", "someone", "that", "could", or "help". By filtering out these terms, the NLP component 106 may more accurately and reliably identify the trigger keywords, such as "go to the airport" and determine that this is a request for a taxi or a ride sharing service.

In some cases, the NLP component 106 can determine that the data packets carrying the input audio signal includes one or more requests. For example, the input audio signal can include the sentence "I want to purchase an audiobook and monthly subscription to movies." The NLP component 106 can determine this is a request for an audio book and a streaming multimedia service. The NLP component 106 can determine this is a single request or multiple requests. The NLP component 106 can determine that this is two requests: a first request for a service provider that provides audiobooks, and a second request for a service provider that provides movie streaming. In some cases, the NLP component 106 can combine the multiple determined requests into a single request, and transmit the single request to a 3P developer device 162. In some cases, the NLP component 106 can transmit the individual requests to another service provider device, or separately transmit both requests to the same 3P developer device 162.

The data processing system 102 can include a direct action API 108 designed and constructed to generate, based on the trigger keyword, an action data structure responsive to the request. The direct action API 108 can generate the action data structure to cause an application to perform the corresponding action. The direct action API 108 can transmit the action data structure to the application installed on the client computing device 128 to cause the client computing device 128 to perform the corresponding action or initiate an action. The action data structure generated by the direct action API 108 can include a deep link for an application installed on the client computing device 128. The application installed on the client computing device 128 can then perform the action or communicate with the 3P developer device 162 or a 3P developer device 162 to perform the action.

Processors of the data processing system 102 can invoke the direct action API 108 to execute scripts that generate a data structure to provide to an application installed on the client computing device 128, a 3P developer device 162, or other service provider to obtain a digital component, content, order a service or product, such as a car from a car share service or an audiobook. The direct action API 108 can obtain data from the data repository 114, as well as data received with end user consent from the client computing device 128 to determine location, time, user accounts, logistical or other information to allow the 3P developer device 162 to perform an operation, such as reserve a car from the car share service. Using the direct action API 108, the data processing system 102 can also communicate with the 3P developer device 162 to complete the operation by in this example making the car share pick up reservation.

The direct action API 108 can execute a specified action to satisfy the end user's intention, as determined by the data processing system 102. Depending on the action specified in its inputs and the parameters or rules in the data repository 114, the direct action API 108 can execute code or a dialog script that identifies the parameters required to fulfill a user request. The direct action API 108 can execute an application to satisfy or fulfill the end user's intention. Such code can look-up additional information, e.g., in the data repository 114, such as the name of a home automation service, or third-party service, or it can provide audio output for rendering at the client computing device 128 to ask the end user questions such as the intended destination of a requested taxi. The direct action API 108 can determine parameters and can package the information into an action data structure, which can then be sent to another component of the data processing system 102 to be fulfilled.

The direct action API 108 can receive an instruction or command from the NLP component 106, or other component of the data processing system 102, to generate or construct the action data structure. The direct action API 108 can determine a type of action in order to select a template stored in the data repository 114. The actions can be fulfilled by applications provided by the data processing system 102 and submitted by a 3P developer device 162. The application can perform or facilitate the performance of the action. Example types of actions can include, for example, watch action, listen action, read action, navigation action, or weather action. Types of actions can include or be configured to provide, for example, services, products, reservations, tickets, multimedia content, audiobook, manage subscriptions, adjust subscriptions, transfer digital currency, make purchases, or music. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 106 can parse the input audio signal to identify a request and a trigger keyword corresponding to the request, and provide the request and trigger keyword to the direct action API 108 to cause the direct action API to generate, based on the trigger keyword, a first action data structure responsive to the request. The direct action API 108, upon identifying the type of request, can access the corresponding template from a template repository (e.g., data repository 114). Templates can include fields in a structured data set that can be populated by the direct action API 108 to further the operation that is requested via input audio detected by the client computing device 128 (such as the operation of sending a taxi to pick up an end user at a pickup location and transport the end user to a destination location). The direct action API 108, or client computing device 128, can launch or trigger an application to fulfill the request in the input audio. For example, a car sharing service application can include one or more of the following fields: device identifier, pick up location, destination location, number of passengers, or type of service. The direct action API 108 can populate the fields with values. To populate the fields with values, the direct action API 108 can ping, poll or otherwise obtain information from one or more sensors 152 of the client computing device 128 or a user interface of the client computing device 128. For example, the direct action API 108 can detect the source location using a location sensor, such as a GPS sensor. The direct action API 108 can obtain further information by submitting a survey, prompt, or query to the end of user of the client computing device 128. The direct action API 108 can submit the survey, prompt, or query via interface 104 of the data processing system 102 and a user interface of the client computing device 128 (e.g., audio interface, voice-based user interface, display, or touch screen). Thus, the direct action API 108 can select a template for the action data structure based on the trigger keyword or the request, populate one or more fields in the template with information detected by one or more sensors 152, from the data value predictor component 112, or obtained via a user interface, and generate, create or otherwise construct the action data structure to facilitate performance of an operation by the 3P developer device 162.

The system 100 can include or communicate with a third party ("3P") developer device 162. The 3P developer device 162 can include one or more system or component of system 400 depicted in FIG. 4. The 3P developer device 162 can include or be associated with one or more computing devices or servers. The 3P developer device 162 can generate, construct or develop an electronic resource or electronic document. An electronic document can refer to or include a web page, HTML document, digital media file, images, text, or a web-based application. The electronic document can include input form field, buttons, graphical user interface elements, or widgets. The electronic document can be presented via a computing device 128, and configured to receive input from a user via an interface of the computing device 128. The electronic document can generate a prompt or other request for input from the user. The electronic document can present visual output or audio output. The 3P developer device 162 can generate, construct or develop one or more portions of the electronic document. The electronic document can be referred to as a 3P document (or 3P electronic resource 134) as it can be provided by the 3P developer device 162. The 3P developer device 162 can provide the 3P electronic resource 134 (e.g., electronic document) to the client computing device 128, or to a cache server that provides the 3P electronic resource to the client computing device 128.

For example, the 3P developer device 162 can include an online retailer. The online retailer can generate an electronic document that is a web page for a product sold by the online retailer. The electronic document can request input from a user to complete a transaction, such as a financial account number. In another example, the 3P developer device 162 can include a package delivery provider, and the electronic document can provide tracking information. The electronic document can request, from the user, a tracking number in order to perform a lookup and determine the tracking status. The user can input the tracking number via an interface of the computing device 128.

However, due to the limited input capabilities on certain computing devices 128 (e.g., small touchscreen or keyboard, voice only input), it can be challenging to input the requested information into an electronic document. Further, the requested input may not be readily available and may result in additional remote procedure calls or lookups into external sources or external account in order to obtain the requested input information. For example, a user may log into an account or data repository different from the electronic document in order to obtain the information requested by the electronic document. On certain computing devices 128 with limited capabilities, it may be challenging, inefficient or not possible to access such external accounts in order to obtain the requested information for the electronic document. Thus, the 3P developer device 162 can provide the electronic document to the data processing system 102 of the technical solution.

The data processing system 102 can include, interface with or otherwise access a validation component 110 designed, constructed or operational to receive, from a third party developer device 162, an intent manifest 118. The validation component 110 can validate the intent manifest based on a validation policy 116. The validation component 110 can store, responsive to validation of the intent manifest, the intent manifest in a data repository 114 of the data processing system 102.

The data processing system 102 can receive the intent manifest 118 from a third-party developer device 162. The intent manifest 118 (or intent manifest data structure) can include a mapping between actions of a digital assistant and link templates of an electronic resource developed by the third-party developer device 162. The intent manifest 118 can be specific to, or configured for, an electronic resource. The intent manifest 118 can facilitate integrating a digital assistant (e.g., via a voice navigator and response component 150) with a web page (e.g., a 3P electronic resource 134).

The intent manifest 118 data structure can include a definition for an action with one or more fields. The action can include an intent name and a fulfillment. The fulfillment can refer to a technique or process for performing the action. The fulfillment can include a URL link template, for example, or a technique to call an JavaScript intent action API. The fulfillment can include one or more parameters that are integrated with the URL link template. The values for the parameters can be predicted, selected, generated or otherwise identified by the data value predictor component 112.

The intent manifest data structure 118 can have name/value pairs. For example, the name can be "intentName" and the value can be "actions.intent.example_action". The name/value pairs can be separated by a ":". The intent manifest 118 data structure can be:

{"action":[{"intentName": "action.intent.NAME", "fulfillment": [{"urlTemplate":

exampledomain_com/?action=exampleaction1{parameter1[parameter1_value], parameter2[parameter2_value], parameter3[parameter3_value]}", "parameter":

[{intentParameter": "exampleaction.parameter1", "isRequired": true, "urlParameter":

"parameter1[parameter1_value]"}, {intentParameter": "exampleaction.parameter2",

-continued

```
"isRequired": true, "urlParameter": "parameter2[parameter2_value]"}, {intentParameter":
"exampleaction.parameter3", "isRequired": true, "urlParameter":
"parameter3[parameter3_value]"}.
```

For example, the intent manifest 118 data structure for a 3P electronic resource 134 that provides a ride sharing or ride ordering function can include:

```
{
  "action": [ {
    "intentName": "actions.intent.ORDER_RIDE",
    "fulfillment": [ {
      "urlTemplate":
"https://m.taxiapp.com/?action=setPickup{&pickup[latitude],pickup[longitude],pickup[nickname
],pickup[formatted_address],dropoff[latitude],dropoff[longitude],dropoff[nickname],dropoff[for
matted_address]}",
      "parameter": [ {
        "intentParameter": "taxiReservation.pickupLocation.geo.latitude",
        "isRequired": true,
        "urlParameter": "pickup[latitude]"
      }, {
        "intentParameter": "taxiReservation.pickupLocation.geo.longitude",
        "isRequired": true,
        "urlParameter": "pickup[longitude]"
      }, {
        "intentParameter": "taxiReservation.pickupLocation.name",
        "urlParameter": "pickup[nickname]"
      }, {
        "intentParameter": "taxiReservation.pickupLocation.address",
        "urlParameter": "pickup[formatted_address]"
      }, {
        "intentParameter": "taxiReservation.dropoffLocation.geo.latitude",
        "isRequired": true,
        "urlParameter": "dropoff[latitude]"
      }, {
        "intentParameter": "taxiReservation.dropoffLocation.geo.longitude",
        "isRequired": true,
        "urlParameter": "dropoff[longitude]"
      }, {
        "intentParameter": "taxiReservation.dropoffLocation.name",
        "urlParameter": "dropoff[nickname]"
      }, {
        "intentParameter": "taxiReservation.dropoffLocation.address",
        "urlParameter": "dropoff[formatted_address]"
      } ]
    } ]
  } ]
}
```

The 3P developer device 162 can construct, generate or develop the intent manifest for the electronic resource. The 3P developer device 162 can construct, generate or develop the electronic resource 134. The validation component 110 can receive the intent manifest 118 submitted by a 3P developer device 162. The validation component 110 can validate the intent manifest 118 using one or more validation policies 116 stored in the data repository 114. The validation component 110 can retrieve, from the data repository 114, a validation policy 116 to apply to the intent manifest. To validate the intent manifest, the validation component 110 can parse the intent manifest. The validation component 110 can parse the intent manifest responsive to receiving the intent manifest from the 3P developer device 162. The validation component 110 can validate the intent manifest responsive to a request to validate the intent manifest. The validation component 110 can receive the request to validate the intent manifest from the 3P developer device 162, or from a component of the data processing system 102.

The validation component 110 can use a validation policy 116 to validate the intent manifest. The validation policy 116 can indicate types of content, formats, scripts, functions, or components that are approved for the intent manifest or prohibited from the intent manifest. The validation component 110 can parse the intent manifest or extract data from the intent manifest. The validation component 110 can compare the output from parsing the intent manifest or the results of extracting the intent manifest with the validation policy 116 to determine if one or more items or components in the intent manifest are prohibited. If the intent manifest passes the validation policy 116 (e.g., validation component 110 does not detected any of the prohibited items as indicated by the validation policy 116), the validation component 110 can indicate that the intent manifest is valid. If, however, the validation component 110 detects, in the intent manifest, one or more prohibited items as indicated by the validation policy 116, then the validation component 110 can determine the intent manifest is invalid.

For example, the validation policy 116 can indicate that intent manifests that are missing one or more pieces of information, such as an action definition, parameter, data value, or link, are invalid or erroneous. For example, the validation component 110, using the validation policy 116, can determine that an intent manifest is invalid if it does not include one or more of an intent name, link template (or URL template), a parameter, a parameter value, or an indication as to whether the parameter is required. The validation component 110, using the validation policy 116, can determine that the intent manifest is missing information if a name is not paired with a value, or if a value is not paired with a name.

The validation policy 116 can indicate a valid format for the intent manifest 118. The validation component 110 can use the validation policy 116 to determine whether the intent manifest is valid or invalid based on the approved format for the intent manifest. For example, a valid format can be a JavaScript Object Notation ("JSON") file. A JSON file can refer to a lightweight format for storing and transporting data. A JSON file can include an array of records. The array of records can include information about an action, fulfillment, link template, or parameters of the link template. A JSON file can be constructed using syntax rules. Syntax rules can include, for example, data in name/value pairs, data separated by commas, curly braces hold objects, and square brackets hold arrays. The validation policy 116 can include these syntax rules as the approved format for the intent manifest data structure 118. The validation component 110 can use this validation policy 116 with the syntax rules to determine whether the format of the intent manifest data structure 118 is valid, and determine whether to validate or invalidate the intent manifest data structure 118 received by the 3P developer device 162.

The validation policy 116 can include testing a link constructed using the link template provided in the intent manifest 118. For example, the validation component 110, based on the validation policy 116, can build a test link using the intent manifest 118. The validation component 110 can input data values for parameters in the link template, and then execute the constructed link to determine whether the link works and can perform the action, or whether the link is broken or results in another failure. Thus, the validation component 110 can determine whether the intent manifest 118 defines the actions, parameters and link template in a manner that results in the construction of a working link to perform the action. The validation component 110 can generate the link or otherwise initiate the action using the intent manifest 118 to determine whether the 3P developer device 162 received the request along with the data values for the parameters used to execute the action. The validation component 110 can receive a status indication from the 3P developer device 162 indicating whether the execution of the action was a success or a failure.

The validation policy 116 can include determining whether the intent manifest 118 includes any malicious code or is susceptible to a hack or security vulnerability. The validation policy 116 can include a trusted list of links or a list of links that are not to be trusted or unauthorized. The validation component 110, using the validation policy 116, can determine whether the links contained in the intent manifest 118 are authorized or unauthorized based on the predetermined lists in order to validate or invalidate the intent manifest 118. For example, a web site can be malicious configured to circumvent restrictions established by a same origin policy of a web browser. The web browser 130 can use the same origin policy to prevent different domains associated with different iframes from accessing data of one another. The data processing system 102 can determine whether a web site is invalid or malicious by identifying the website in the link template 122 in the intent manifest 118, and determining whether the link is valid. This can be based on a predetermined trusted list, or a predetermined list of untrusted or malicious websites. Thus, using the intent manifest 118, the data processing system 102 can validate the 3P electronic resource 134.

The validation component 110 can apply or execute the validation policy 116 to determine whether to block, reject, prevent or remove, from storage, the intent manifest 118. Thus, the validation component 110, using the validation policy 116, can determine to validate or not validate the intent manifest 118 based on whether the intent manifest 118 does not have missing information, is in the right format, or can be used to build a working link. For example, the validation component 110 can validate, responsive to the determination that the format is correct and there is no missing information from the intent manifest 118, the intent manifest 118 for storage in the data repository 114 of the data processing system 102. If, for example, the validation component 110 detects an incorrect or unapproved format, or missing information in the intent manifest 118, the validation component 110 can determine, responsive to detection of the incorrect format or missing information in the intent manifest 118, not to validate the intent manifest 118 and remove the intent manifest 118 from storage in the data repository 114.

The validation component 110 can validate the intent manifest 118 before storing the intent manifest 118 in storage of the data processing system 102, or in a data repository 114. The data processing system 102 can store validated intent manifests 118. The data processing system 102 can determine not to store invalid intent manifests 118. The data processing system 102 can determine to remove invalid intent manifests 118 that fail the validation process performed by the validation component 110. By determining to not store invalid intent manifests 118, the data processing system 102 can reduce memory or storage utilization in the data repository 114. The data processing system 102 can prevent or mitigate erroneous activity from occurring on a client computing device 128 by not forwarding an invalid document to the client computing device 128, thereby preventing the client computing device 128 from executing or rendering an invalid intent manifest 118 that may contain errors or unauthorized functionality. The data processing system 102 can prevent or mitigate security failures by determining not to use invalid intent manifest 118 to fulfill actions or intents from client computing devices 128. Thus, the validation component 110 can reduce computing resource utilization of the data processing system 102 (e.g., memory utilization), reduce or prevent errors or crashes from occurring on the client computing device 128, and avoid security failures on the client computing device 128. A security failure can occur as a result of an intent manifest 118 containing a link template that may be susceptible to a hack or vulnerability that can be exploited by a malicious third part. The validation component 110, using the validation policy 116, can determine not to store, in the data repository 114, such intent manifests 118 and not to use such intent manifests 118 to fulfill intents or actions from client computing devices 128.

The data processing system 102 can provide a prompt to the 3P developer device 162 indicating the status of the validation. The data processing system 102 can indicate that validation was successful or that validation was unsuccessful or a failure. If the data processing system 102 determines that an intent manifest 118 is invalid or fails validation, the data processing system 102 can automatically resolve, modify, or fix the errors detected in intent manifest 118 so the intent manifest 118 can be validated, or the data processing system 102 can transmit a request to the 3P developer device 162 to resolve the errors detected in the intent manifest 118.

The data processing system 102 can automatically resolve, debug, or fix the intent manifest 118 responsive to detection of an error or that the intent manifest 118 is invalid. The data processing system 102 can automatically debug or resolve the intent manifest 118 by removing or scrubbing the erroneous or invalid code, actions or links. For example, the data processing system 102 can remove references to parameters that are unavailable or not used to perform the action. The data processing system 102 can remove references to actions that are not capable of being performed by the digital assistant system. The data processing system 102 can automatically resolve the intent manifest 118 containing code in an invalid format by translating or re-formatting the code into a valid or approved format. For example, the data processing system 102 can detect that the syntax of the intent manifest 118 is not in the JSON format, and automatically translate the intent manifest 118 into an approved syntax or format, such as JSON or some other approved format. Thus, the validation component 110 can determine whether an intent manifest 118 is valid using a validation policy 116, determine whether to store the intent manifest 118, reject the intent manifest 118, or resolve the intent manifest 118 prior to storage in the data repository 114. The data repository 114 can save or store intent manifest 118 that have been validated.

The client computing device 128 can include or execute a web browser 130. The web browser 130 can include an application designed, constructed or operational to render or present electronic content. The web browser 130 can include or be, for example, an application. The web browser 130 can be a native application, web application, or other component configured to transmit requests for a 3P electronic resource 134, receive a 3P electronic resource 134, and render a 3P electronic resource 134. The web browser 130 can be configured to transmit requests for a 3P electronic resource 134 to the data processing system 102 or a 3P developer device 162 or some other server, such as a cache server. In some cases, the data processing system 102 can include a cache server that can intercept a request to access the a 3P electronic resource 134. Intercepting the request can refer to the cache server receiving the request for the a 3P electronic resource 134 instead of the 3P developer device 162. The cache server can intercept the request by configuring the web browser 130 with the IP address of the cache server such that requests for electronic documents for the 3P developer device 162 are transmitted to the cache server instead of the 3P developer device 162, or a server associated with the 3P developer device 162. By configuring the web browser 130 to transmit requests to the cache sever instead of the 3P developer device 162, the system 100 can reduce lag or delay associated with responses to requests for electronic document.

The web browser 130 can load a 3P electronic resource 134 in the web browser 130. The web browser 130 can receive the 3P electronic resource 134 from the data processing system 102 or 3P developer device 162 or other server. The web browser 130 can parse or process the 3P electronic resource 134 (e.g., electronic document or web page) to render or otherwise present the 3P electronic resource 134 in the web browser 130. The web browser 130 can parse the 3P electronic resource 134 to determine whether to retrieve, download, or otherwise obtain or utilize additional resources for the 3P electronic resource 134.

The web browser 130 can transmit one or more requests to one or more servers to download one or more additional files or resources associated with the 3P electronic resource 134. Additional files or resources can include, for example, a cascading style sheet ("css" file) or images. A css file can be a text file used for formatting content on the electronic document and can include information such as font, size, color, spacing, boarder, or location of HTML information on the electronic document. The web browser 130 can, upon downloading the one or more files or resources associated with the electronic document, build the electronic document. The web browser 130 can build the electronic document for display by combining the information found in the retrieved electronic document (e.g., the original HTML file) and the additional information found in the resources. The web browser 130 can build the document object map ("DOM"), which can include a map of where things are displayed on a page according to the HTML. The DOM can map out the page in a relational manner. The web browser 130 can build the CSS object map ("CSSOM"), which can map what styles should be applied to different parts of the electronic document according to the CSS using styles. The web browser 130 can build render tree, which can include combining the DOM and the CSSOM to create a map of how the electronic document is to be laid out and painted.

The web browser 130 can render or paint the electronic document in a parent frame 132. The parent frame 132 can refer to loading the electronic document in the web browser 130 itself, as opposed to in an iframe 138. The web browser 130 can, in some cases, load the electronic document in an iframe 138. For example, the web browser 130, or electronic document, can establish one or more iframes 138 and load the content of the 3P electronic resource in an iframe.

The 3P electronic resource 134 can include HTML content, JavaScript content, XML content, or other types of content. The 3P electronic resource 134 can include a JavaScript ("JS") library 148. The JS library 148 can be embedded or included with the 3P electronic resource 134. The 3P developer device 162 can provide or establish the JS library 148 with the 3P electronic resource 134. The 3P developer device 162 may download the JS library 148 from the data processing system 102 (e.g., from data repository 114), and then install, link, include, or otherwise provide the JS library 148 with the 3P electronic resource 134 such that when the 3P electronic resource 134 is downloaded by the client computing device 128, the JS library 148 is included with the 3P electronic resource 134.

The JS library 148 can safely and securely host digital assistant functionality as an overlay rendered on the 3P electronic resource 134 with the ability to provide interactions and authenticated callbacks to a data processing system 102 in a manner opaque to the 3P electronic resource 134. The JS library 148 of the present technical solution can provide a secure communication because the 3P electronic resource 134 can be prohibited or prevented from accessing the data associated with the JS library 148 or communications with the data processing system 102 prior to authorization. The secure provision of such data values can reduce processor, memory or battery consumption of the computing device by reducing the amount of delay caused by inputting data values or launching additional applications on the client computing device 128 to obtain the data values.

The JS library 148 can be hosted in an iframe 138. The JS library 148 can provide or execute a data exchange component 140 and authorization component 142. The JS library 148 can include code, programs, scripts, rules or logic to provide a digital assistant functionality for the 3P electronic resource 134. Digital assistant functionality can include, for example, a voice interface with NLP processing via the NLP component 106, voice-based navigation of the 3P electronic resource 134, and predicted data values to perform actions on the 3P electronic resource 134.

The JS library 148 can load or establish the iframe 138 to communicate with the data processing system 102. The iframe 138 can be linked with the data processing system 102 or a web domain associated with the data processing system 102. The JS library 148, or one or more components hosted in the iframe 138, can communicate with one or more other iframes or the parent frame 132 of the 3P electronic resource 134 using a post message API.

The JS library 148, hosted in the iframe 138, can access data stored in the data repository 114. The JS library 148 can access the data repository 114, whereas the 3P electronic resource 134 can be prohibited from accessing the data repository 114. The JS library 148 can be configured with an identifier, token, or other credential that allows the JS library 148 to communicate with the data processing system 102 and data repository 114 thereof. Because the iframe 138 is hosted with a different web domain name, the web browser 130 can prohibit or prevent the 3P electronic resource 134 of the 3P developer device 162 from accessing certain data of the different web domain associated with the data processing system 102. The web browser 130 can use a same origin policy to different domains from interacting with one another in order to restrict access to the other domain.

The JS library 148 can establish the iframe 138 of the web browser 130 after the web browser 130 builds the electronic document. The web browser 130 can include an iframe 138. An iframe 138 can refer to an inline frame. The iframe 138 can be an HTML document embedded inside another HTML document in the web browser 130. The web browser 130 can use the iframe 138 element as an overlay in which the digital assistant functionality can be provided. The iframe 138 can be embedded in the web browser 130. The web browser 130 can load, in the iframe 138, a data exchange component 140 and an authorization component 142. The data processing system 102 can authorize the data exchange component 140 to load in the iframe 138 of the 3P electronic resource 134 responsive to validation of the 3P electronic resource 134 via the validation policy 116. The data processing system 102 can validate the 3P electronic resource 134 based on the intent manifest 118. The 3P electronic resource 134 can be validated by virtue of the intent manifest for the 3P electronic resource 134 being validated by the validation component 110. If the validation component 110 validates the intent manifest 118 using one or more validation policies 116, then the data processing system 102 can determine that the 3P electronic resource 134 is authorized to load the JS library 148 in the iframe 138, and establish the data exchange component 140 with access to the identifier of the client computing device 128 and allow the communication between the data exchange component 140 and the data processing system 102. If, however, the intent manifest 118 was deemed invalid by the data processing system 102, the data processing system 102 can prevent the data exchange component 140 from being established, which can refer to or include denying the data exchange component 140 access to the data processing system 102 or account 124 information. The web browser 130 can restrict components from accessing certain portions of the web browser 130 or accessing certain memory or functionality of the client computing device 128. Thus, the web browser 130 can establish security restrictions or other controls for the iframe 138 or parent frame 132 to limit the types of access or functionality provided by the iframe 138 or parent frame 132.

The web browser 130 can include or execute a data exchange component 140. The data exchange component 140 can include one or more rules, scripts, or a program. The data exchange component 140, loaded in the iframe 138 via the JS library 148, can determine an identifier of the client computing device 128. The identifier can be associated with an account 124 that is linked to or corresponds to the client computing device 128. The identifier can be an account identifier for the client computing device 128. The identifier can be an alphanumeric identifier, token, key, numeric identifier, or other identifier. The identifier can be stored in a memory or other storage on the client computing device 128. However, the 3P electronic resource 134 may be restricted from accessing the memory of the client computing device 128 that stores the identifier. The web browser 130 can prevent unauthorized components from accessing the identifier. The data exchange component 140 of the JS library 148 loaded in the iframe 138 can access the memory because the data exchange component 140 be associated with the same source or origin of the identifier, such as the web domain of the data processing system 102. Thus, the data exchange component 140 can obtain the identifier of the account 124 from memory of the client computing device 128. The data exchange component 140 can, via same origin policy of the web browser 130 or other configurations, restrict the 3P electronic resource 134 in a parent frame 132 from accessing the identifier of the client computing device 128. The 3P developer device 162 that developed the 3P electronic resource 134 can be prohibited from accessing the identifier of the client computing device 128.

The data exchange component 140 can include or be configured with one or more protocols to communicate with the web browser 130, parent frame 132, data processing system 102 or client computing device 128. The data exchange component 140 can communicate with one or more component of the 3P electronic resource 134 by sending messages. The data exchange component 140 can send messages to, from or between iframes 138, a parent frame 132, or components of the 3P electronic resource 134. For example, the web browser 130 (e.g., via data exchange component 140) can send messages to an iframe 138 (or data exchange component 140) using, for example, "iframeE1.contentWindow.postMessage". The web browser 130 or parent frame, via the data exchange component 140, can receive messages using, for example, "window.addEventListener('message'). The iframe 138 (or data exchange component 140) can send messages to the web browser 130 using, for example, "window.parent.postMessage". The iframe 138 (e.g., data exchange component 140) can receive messages using, for example, "window.addEventListener ('message'). This postMessageo technique can accept parameters, such as message and targetOrigin. The message parameter can include a string or an object that is to be sent to the receiving window. The targetOrigin parameter can include the uniform resource locator ("URL") of the window that the message is being sent to. The protocol, port and hostname of the target window can be set to match this parameter for the message to be sent. Using a wildcard, such as "*" can match any URL.

The data exchange component 140 and other components or resources loaded in the web browser 130 can communicate with one another. For example, the data exchange component 140 can correspond to an iframe 138 and the 3P electronic resource 134 can execute in an iframe 138 that is a child frame of the parent frame 132. In another example, the data exchange component 140 can be loaded in a separate iframe 138, in which case the data exchange component 140 and 3P electronic resource 134 (e.g., onsite intent execution API 144) can communicate with one another using the parent frame 132 of the web browser 130 as a relay. For example, a parent frame 132 (e.g., first frame) can have two child iframes (e.g., second iframe and third iframe). The second iframe can communicate with the parent frame 132, which can relay the communication to the third iframe 138. The third iframe 138 can reply to the communication by sending a message back to the parent frame 132, which can relay the message to the second iframe 138.

The data exchange component 140 can transmit or provide the identifier of the client computing device 128 to the data processing system 102. The data processing system 102 can receive, from the data exchange component 140 of the iframe 138 of the 3P electronic resource 134 loaded by the client computing device 128, the identifier of the client computing device 128 that executes the 3P electronic resource 134. The data processing system 102 can query an onsite state sharing API 146 for information about a state of the 3P electronic resource 134. The data processing system 102 can query the onsite state sharing API 146 responsive to receiving the identifier of the client computing device 128 or other request.

The 3P electronic resource 134 can be configured or constructed with an onsite state sharing application programming interface ("API") 146. The 3P developer device 162 can develop or construct the 3P electronic resource 134 with the onsite state sharing API 146. The 3P developer device 162 can develop or construct the 3P electronic resource 134 to interface with the onsite state sharing API 146. The onsite state sharing API 146 can be designed, constructed or operational to determine a semantic foreground state of the 3P electronic resource 134, and provide the semantic foreground state information to the data processing system 102.

The onsite state sharing API 146 can include one or more rules, logic, code, scripts, or a program configured to identify, detect or determine the semantic state of the 3P electronic resource 134. The onsite state sharing API 146 can include a schema definition or repository that includes entities, such as person, places or things, and a relationship between entities. The onsite state sharing API 146 can include a monitor or tracker component to identify a current state of the 3P electronic resource 134. For example, the onsite state sharing API 146 can parse the foreground of the 3P electronic resource 134 to identify content being displayed, or any tags or markup language that can indicate a semantic foreground state. The onsite state sharing API 146 can detect text, metadata, input fields, buttons, or other graphical user interface widgets. The onsite state sharing API 146 can translate the detected information, using a semantic analysis or processing technique, to structured data corresponding to a schema.

The onsite state sharing API 146 can include or provide a JavaScript callback. A callback can refer to or include a function that is executed after another function has finished executing. The onsite state sharing API 146 can be implemented by the 3P developer device 162 for the site to publish the semantic foreground state when requested by a data processing system 102. The data processing system 102 can query or request the semantic foreground state from the onsite state sharing API 146. Responsive to the request, the onsite state sharing API 146 can provide the semantic foreground state. The semantic foreground state can refer to the present semantic state of the 3P electronic resource 134, such as what is being displayed on the web page or what functions or actions are being performed or available. The semantic state information can be coded or conveyed using a schema that provides structure to the semantic state. The semantic state can include one or more entities representing a real-world or physical concept in the foreground of the electronic resource as structured data. An entity can refer to a person, place or thing. The entity can have a unique identifier. The entity can include a property, type and description. Entities can include a relationship to one or more other entities. Entities can provide a structure to data. The semantic state can include one or more digital assistant intents that are transiently available in the current context of the electronic resource.

The onsite state sharing API 146 can be configured by the 3P developer device 162 with the semantic state information for one or more states of the 3P electronic resource. For example, semantic state information for a ride sharing electronic resource can include a type of action such as "ride" or "order ride" or "ride request". Additional semantic foreground information can include a location of the client computing device 128, destination, type of vehicle, or pickup time. In another example, the electronic resource can correspond to tickets to a music concert. The semantic foreground information can include "ticket", "purchase", "price", or "quantity".

The data processing system 102 can receive the semantic foreground state of the electronic resource from the onsite state sharing API 146. The data processing system 102 can receive the semantic foreground state information from the web browser 130 via the client computing device 128, or from the 3P developer device 162. For example, the 3P developer device 162 can receive the semantic foreground state information from the onsite state sharing API 146. The data processing system 102 can query the 3P developer device 162 for the semantic foreground information using a unique identifier associated with the 3P electronic resource 134 rendered on the client computing device 128. The data processing system 102 can receive, responsive to querying the 3P developer device 162, the onsite state sharing information.

The data processing system 102 can receive the semantic foreground state information via the data exchange component 140. The data processing system can 102 receive the semantic foreground state from the JS library 148, which receives the semantic foreground state from the onsite state sharing API 146 of the third party electronic resource 134. The data exchange component 140 can interface or communicate with the onsite state sharing API 146 using a messaging protocol of the web browser 130. The data processing system 102 can query the data exchange component 140 to for the state information. The data exchange component 140 can query the onsite state sharing API 146 for the current semantic foreground state of the 3P electronic resource 134. The onsite state sharing API 146 can provide the semantic foreground state to the data exchange component 140, which can forward the semantic foreground state to the data processing system 102.

The data processing system 102 can receive, from the data exchange component 140, the semantic foreground state of the electronic resource 134 from the onsite state sharing API 146 of the electronic resource 134. The data processing system 102 can receive the information responsive to a query. The data processing system 102 can include a data value predictor component 112 designed, constructed or operational to determine a parameter based on the semantic foreground state and the intent manifest data structure 118, and select a data value for the parameter based on the identifier of the client computing device 128.

The data value predictor component 112 can accept as input the semantic foreground state. The semantic foreground state can indicate or identify the current intent associated with the electronic resource. The data value predictor component 112, using the semantic foreground state information, can search a data repository or database linked with the client computing device 128 (or account 124 thereof) that renders the electronic resource 134. The data value predictor component 112 can search the database to predict data values for the parameters of the current intent. If the data value predictor component 112 identifies an acceptable prediction, the data value predictor component 112 can provide the predicted value to the JS library 148 (or component thereof). The JS library 148 (e.g., via authorization component 142) can present the predicted data value for authorization. If the predicted data value is authorized, the data value can be provided or passed to the electronic resource. The JS library 148 can provide the predicted and authorized data value to the third party electronic resource 134 through a link (e.g., a URL deep link) or a JavaScript intent execution API 144.

For example, the electronic resource can include a car rental website. The data processing system can identify the current semantic foreground state that indicates an intent of book_car_rental(to_location, from_location, start_time, end_time). The data processing system can search and identify data about an upcoming flight reservation stored in a database associated with an account corresponding to the client computing device rendering the third party electronic resource. The data processing system can predict data values for the intent parameters based on the data in the database. The data processing system can transmit the predicted data values for the parameters to the client computing device. The data processing system can execute an action corresponding to the intent on the third party electronic website responsive to authorization.

The data value predictor component 112 can use one or more selection technique to identify data values responsive to the semantic foreground state information provided by the onsite state sharing API 146. Using the semantic foreground state information, the data value predictor component 112 can identify an action in the intent manifest 118 for the 3P electronic resource 134. The data value predictor component 112 can perform a lookup in the data repository 114 to identify or select the intent manifest data structure 118 that corresponds to or matches the semantic foreground state. The data value predictor component 112 can use a semantic selection technique, or other selection or matching technique to identify the intent manifest 118 for the 3P electronic resource 134. For example, the data value predictor component 112 can determine the domain of the 3P electronic resource 134, and then identify one or more intent manifests 118 having a link template 122 that matches the domain of the 3P electronic resource 134. Thereafter, the data value predictor component 112 can select an intent manifest 118 of the 3P electronic resource 134 that contains an action that corresponds to the semantic foreground state. For example, if the semantic foreground state indicates "order ride", then the data value predictor component 112 can select the intent manifest 118 with the action "order ride".

The onsite state sharing API 146 can provide semantic foreground state information corresponding to the action in the intent manifest 118 so that the data value predictor component 112 can identify a match. The data value predictor component 112 can use various matching or selection techniques to predict a match. The data value predictor component 112 can determine a matching score between each intent manifest 118 or action 120 and the semantic foreground information to determine a highest scoring match or most relevant match.

Upon identifying a matching intent manifest 118, or action 120, the data value predictor component 112 can determine parameters of the link template 122. The intent manifest 118 maps actions 120 to link templates 122. The data value predictor component 112 can identify the link template 122 that corresponds to the action 120 that corresponds to the semantic foreground state. The data value predictor component 112 can identify parameters of the link template 122. The link template 122 can include one or more parameters. The parameters can include a parameter name. The parameter in the link template 122 can serve as a placeholder for a parameter data value.

The data value predictor component 112 can identify data values for the parameters of the link template 122. The data value predictor component 112 can access data repository 114 to identify account information 124 that stores data values 126. The data value predictor component 112 can perform a lookup in the account 124 data structure to determine data values 126 that are responsive to the parameters of the intent manifest 118 and facilitate the 3P electronic resource 134 or 3P developer device 162 in performance of a service, action or function. The data value predictor component 112 can select or identify values that can be used by the direct action API 108 to generate an action data structure that can be transmitted to the 3P developer device 162 to perform or fulfill a request.

The data value predictor component 112 can use a semantic processing technique, selection criteria, machine learning, or other technique to select or identify candidate data values for the parameters of the link template 122 of the intent manifest 118. The data value predictor component 112 can access one or more sources to determine the data values. For example, the data value predictor component 112 can access an account data structure 124 containing data values 126 associated with the client computing device 128, or user thereof. The data processing system 102 can be configured to query external data sources associated with the client computing device 128, responsive to authorization from the client computing device 128.

The data value predictor component 112 can identify one or more data values that are responsive to the semantic foreground state information received from the data exchange component 140. The data value predictor component 112 can identify multiple data values. The data value predictor component 112 can determine to transmit one or more data values identified by the data value predictor component 112 to the data exchange component 140 or web browser 130. In some embodiments the data value predictor component 112 may not be able to identify particular data values that are directly responsive to the context information and can determine to transmit a subset of the identified data values based on a ranking or filter technique. For example, each data value can be associated with a confidence score or ranking score or relevance score. The data value predictor component 112 can determine to transmit the highest ranking data values because those data values may be the most likely to be responsive to the semantic foreground information of the 3P electronic resource 134. In some cases, the data value predictor component 112 can transmit the top three ranking data values, top five, top 10, or other number of the data values.

For example, the semantic foreground state information can indicate an intent manifest 118 with an action 120 having a geographic address parameter requested by the 3P electronic resource 134 in order to perform a service or action. The data value predictor component 112 can perform a lookup in the data value data structure 126 of the account 124 corresponding to the client computing device 128 to identify the address. The data value 126 can include one or more addresses. The data value predictor component 112 can transmit, responsive to the request, the one or more addresses retrieved from the data values data structure 126. In another example, the link template 122 can indicate that a financial account information is requested by the 3P electronic resource 134 to perform an action or service. The data value predictor component 112 can perform a lookup in the data value 126 data structure to identify one or more account identifiers, and transmit, via network 101, the one or more account identifiers to the web browser 130. Thus, the data value predictor component 112 can generate data values responsive to the intent manifest 118.

The data processing system 102 can determine, based on the semantic foreground state, a multiple parameters used to execute the action provided by the electronic resource 134. For example, the intent manifest 118 having the action 120 that matches or corresponds to the received semantic foreground state can include multiple parameters. The data processing system 102 select, based on the identifier of the client computing device 128, a multiple data values corresponding to the multiple parameters. For example, for an "order ride" action, the parameters can include "pick up longitude", "pickup latitude", "account identifier", "financial account information", "pick up time", "destination longitude", or "destination latitude". The data processing system 102 can provide the data values to the authorization component 142 to cause the authorization component 142 to provide the data values to the onsite intent execution API 144. The onsite intent execution API 144 can then use the data values to bypass one or more states used by the electronic resource 134 to execute the action.

The 3P electronic resource 134 may have used multiple states, pages, flows, prompts or requests to obtain the data value input for the parameters to perform the action. For example, the transaction flow for ordering a ride can include a first page in which a user initiates the request, a second page in which the user inputs a pick up location, a third page in which the user inputs a destination, a fourth page in which the user selects a payment information, and a fifth page in which the user transmits the request. However, since the data value predictor component 112 can use the intent manifest 118 to identify multiple parameters needed to execute an action 120, the JS library 148 can provide all of the data values for the parameters of the action 120 in a single communication or transmission, or a series of data packets that are part of a single transmission. The onsite intent execution API 144, upon receiving the multiple parameters and data values, can bypass one or more pages in the ride ordering transaction flow and proceed directly to executing the action to request the ride, or requesting confirmation to execute the ride. For example, the onsite intent execution API 144 can skip the second page, third page, or fourth page. Thus, data processing system 102, via the JS library 148, onsite state sharing API 146, and onsite intent execution API 144, can facilitate input and may reduce computing resource consumption and remote procedure calls by bypassing one or more pages, requests or prompts to perform an action.

The data processing system 102 can determine, based on the semantic foreground state and the intent manifest data structure 118, one or more subsequent states of the electronic resource 134. For example, the intent manifest structure 118 can include multiple parameters for the link template 122. The multiple parameters can indicate subsequent requests for input data values. The data processing system 102 can determine that the 3P electronic resource 134 is configured to request, in one or more subsequent states, data value information from a user. The subsequent states can include different web pages, drop down menus, buttons, prompts, or other graphical user interface elements for the input data value information. The data processing system 102 can determine, based on semantic foreground information, the multiple subsequent states. The data processing system 102 can determine the multiple subsequent states based on historical state information for the 3P electronic resource 134, or based on historical information associated with the semantic foreground state information. The semantic foreground state can be associated with a predetermined set of subsequent states, or may historically be followed by one or more states. For example, a semantic foreground state of purchasing a sneaker can be typically followed by a request for shoe size, address, billing information, and shipment method. The data processing system 102 can select, based on the identifier of the client computing device 128 or account 124 identifier, one more data values for the one or more parameters prior to the electronic resource entering the one or more subsequent states. For example, before the 3P electronic resource 134 requests a sneaker size, billing information, or other information, the data processing system 102 can select the data values via the data value predictor component 112. The data processing system 102 can provide the data values before the 3P electronic resource 134 enters the subsequent states, thereby allowing the 3P electronic resource to bypass those states, or make those states more efficient by having the data value input readily available upon entry of the state.

The data processing system 102 can provide the data value for the parameter to the JS library 148. The data processing system 102 can provide the data value for the parameter to the data exchange component 140 or authorization component 142. For example, the data processing system 102 can provide the selected candidate data value to the authorization component 142 of the JS library 148 in the iframe 138 to determine whether the 3P electronic resource 134 is authorized to receive the data value. The authorization component 142 can generate an authorization prompt, receive, responsive to the authorization prompt, input from the client computing device 128, and transmit, responsive to authorization of the data value, the data value to an onsite intent execution API 144 of the electronic resource 134 to cause the electronic resource 134 to execute an action with the data value.

The authorization component 142 can include one or more rules, policies, code, programs or scripts. The authorization component 142 can be established or hosted by the JS library 148 in the iframe 138. The authorization component 142 can securely receive the data value without sharing or otherwise granting access to the data vale to the 3P electronic resource 134 or 3P developer device 162 without authorization. The web browser 130 can prevent the 3P electronic resource 134 from accessing data values received by the authorization component 142.

The authorization component 142 can be constructed or operational to generate a prompt comprising the one or more data values received form the data processing system 102. The authorization component 142 can generate graphical user interface, window, button, or other notification that includes the one or more data values. The authorization component 142 can generate the prompt containing the data values prior to granting the 3P electronic resource 134 with access to the data values, thereby maintaining a secure communication channel. The authorization component 142 can generate a popup window or other user interface element with one or more buttons or controls. The authorization component 142 can determine to overlay the window over the 3P electronic resource 134. For example, the authorization component 142 can generate a suggestion drop down menu or auto fill drop down menu or suggests at a position on the 3P electronic resource 134 that corresponds to the input form field or input text box on the 3P electronic resource 134. The authorization component 142 can render the data value on the 3P electronic resource 134 in a separate iframe that is secure and cannot be accessed by the 3P electronic resource 134.

The authorization component 142 can be configured to prohibit the 3P electronic resource 134 from accessing the data value prior to authorization of the data value. For example, the authorization component 142 may have had access to the data value in order to generate the prompt, but the onsite intent execution API 144 and 3P electronic resource 134 may not have had access to the data value unless it was authorized by the client computing device 128. Further, the 3P electronic resource 134 or onsite intent execution API 144 may not have access to all the candidate data values transmitted by the data processing system 102 to the web browser 130 and provided in the prompt by the authorization component 142. Rather, the 3P electronic resource 134 may be granted access to the data value authorized by the client computing device 128, but not to the other candidate data values displayed in the prompt by the authorization component 142 but not selected by the client computing device 128 for provision to the 3P electronic resource 134. Thus, the JS library 148 can be configured to only transmit authorized data values to the onsite intent execution API 144 for input into the 3P electronic resource 134.

The authorization component 142 can provide the data values for display and include an input button to allow the client computing device 128 to select the data value or authorize a data value for transmission to the 3P electronic resource 134. For example, the authorization component 142 can receive three different addresses from the data value predictor component 112. The authorization component 142 can provide, in a secure manner, an indication of the three candidate addresses via the web browser 130. The authorization component 142 can include a button or other input mechanism to allow the client computing device 128 to select one of the three candidate addresses. The web browser 130 can receive, from the client computing device 128, a selection of a data value or an authorization to transmit or provide the data value to the 3P electronic resource 134. The web browser 130 can receive, responsive to the prompt, input from the client computing device 128 authorizing the data value.

Responsive to the authorization of the data value by the authorization component 142, the JS library 148 can provide the data value to the 3P electronic resource 134, or execute a link constructed using the link template 122 and the authorized data values. The data processing system 102 can construct the link using the link template 122, and provide the link to the JS library 148 (e.g., via data exchange component 140). The data exchange component 140 can provide the link to the onsite intent execution API 144 for execution. The onsite intent execution API 144 can execute or launch the constructed link to initiate performance of the action.

In some cases, the JS library 148 can provide the data values to the onsite intent execution API 144. The onsite intent execution API 144 can obtain the data values and initiate performance of the action without redirecting the web browser 130 to a different web page via the link. The onsite intent execution API 144 can input the data value into the 3P electronic resource 134 and cause the 3P electronic resource 134 to execute an action using the data value. For example, the onsite intent execution API 144 can input an address into an input form field in the 3P electronic resource 134, and then select a link or other trigger to initiate processing of the address to perform a function. The onsite intent execution API 144 can input one or more authorized data values into one or more input fields in the 3P electronic resource 134. The data processing system 102 can provide the data value to the onsite intent execution API 144 to cause the onsite intent execution API 144 to input the data value into an input text box of the electronic resource 134.

The data processing system 102 can provide, prior to the electronic resource 134 requesting the data value, the data value for authorization by the authorization component 142 and input to the onsite intent execution API 144. The data processing system 102 can predict or determine the data value for input based on the one or more parameters in the intent manifest 118 for the electronic resource 134, and provide the data value to the client computing device 128 prior to the electronic resource 134 having to request the data value.

The data processing system 102 can provide the data value to the client computing device to cause the client computing device 128 to build a deep link with the data value, and load the deep link in a web browser 130 executed by the client computing device 128. For example, the data processing system 102 provide the link template 122 to the client computing device 128. Upon authorization of the data values, the JS library 148 or onsite intent execution API 144 can build the link using the data values. In some cases, the onsite intent action API 144 can have the link template or other intent execution technique built-in. The onsite intent execution API 144 can generate, build or otherwise construct a link or other command with the data values. The onsite intent execution API 144 can determine whether to construct a deep link with the data values for the parameters, or to generate another type of command to transmit to the 3P developer device 162 to perform the action.

For example, to book a flight, the onsite intent execution API 144 can construct a deep link with data values, and launch the deep link in the web browser 130. The onsite intent execution API 144 can cause the web browser 130 to load the deep link with the data values to display the available flights and prices and allow the user to select the flight. In another example, such as to order a ride, the onsite intent execution API 144 can determine to generate a command with the data values to perform the action of ordering a ride without causing the web browser 130 to load a new web page. Instead, the onsite intent execution API 144 can determine that it may be more efficient to display a prompt requesting approval or authorization to order the ride (or perform the action 120) with the predicted data values. Upon confirmation, the onsite intent execution API 144 can transmit the command to the 3P developer device 162 to cause the 3P developer device 162 to fulfill the action. Thus, it may be more efficient from a computing device processing standpoint to avoid redirecting the web browser 130 to a new web page and loading the web page, and instead transmitting a command to the 3P developer device 162 to execute the action.

The onsite intent execution API 144 can determine whether to generate and load the deep link or transmit a command without loading a deep link based on a policy. The policy can be whether additional data value input is needed to perform the action, for example. If the action can be performed based on all the predicted data values, then it may be more efficient to transmit a command without loading the deep link. However, if additional input is to be obtained, such as a selection of a flight from multiple options, then the onsite intent execution API 144 can load the deep link. The data processing system 102 can build a link with the data value based on a link template 122 that maps to the action 120, and provide, via the data exchange component 140, the link to the onsite intent execution API 144. The onsite intent execution API 144 can determine whether to load the link, or otherwise transmit the link or a command or information based on the link to the 3P developer device 162 (e.g., a server associated with the 3P developer device 162 to fulfill the action 120) to execute the action.

The onsite intent execution API 144 can determine whether the data values or link is valid. For example, if the electronic resource 134 relates to tracking shipment information, and the input data value is a tracking number, the onsite intent execution API 144 can determine whether the format of the data value corresponds to the predetermined format (e.g., alphanumeric, number of digits, order of numbers and letters) of the tracking number used by the 3P developer device 162. The onsite intent execution API 144, upon determining that the data value is valid, can construct a deep link with the data value.

The onsite intent execution API 144 can include a JavaScript callback implemented by the 3P developer device 162 for the electronic resource 134 to process a digital assistant intent triggered by a data processing system 102 or client computing device 128. A digital assistant intent can refer to an action 120 in the intent manifest 118.

The client computing device 128 can include a voice navigator and response component 150. The voice navigator and response component 150 can interface with one or more of the sensor 152, transducer 154, audio driver 156, preprocessor 158, or display device 160. The voice navigator and response component 150 can include one or more component or functionality of the data processing system 102, such as the NLP component 106 or direct action API 108.

The voice navigator and response component 150 can be referred to as a digital assistant component or client or local digital assistant component. The data processing system 102 can be referred to as a server digital assistant component. The data processing system 102 can invoke the voice navigator and response component 150 when the data processing system 102, via a natural language processor component 106, provides a structured intent parse (e.g., action 120 or link constructed based link template 122) that can be handled by a third party electronic resource 134 integrating with the voice navigator and response component 150 and JS library 148. The technology can translate the user intent parse into a URL link or JavaScript intent execution call, which can be used to navigate the electronic resource 134 via the onsite intent execution API 144. After the JS library 148 executes an intent on the third party electronic resource 134 via the onsite intent execution API 144, the JS library 148 can request the foreground semantic state from the JavaScript callback of the electronic resource 134. The voice navigator and response component 150, or data processing system 102, can match the foreground state data with a voice response (text-to-speech) template that has been pre-associated with the matched user intent. The voice navigator and response component 150 can render the text-to-speech response to the user by passing the state data into the template. This technology can allow the user to voice-navigate throughout a website and hear a text-to-speech ("TTS") answer after each voice navigation.

The voice navigator and response component 150 can allow for voice-based navigation on an electronic resource 134. The voice navigator and response component 150 can receive, from a sensor 152 (e.g., microphone) an audio input. The voice navigator and response component 150 can transmit the audio input (or transmit pre-processed audio input via data packets) to the data processing system 102. The data processing system 102, via NLP component 106, can determine an intent in the audio input. The data processing system 102 can determine the intent is to perform an action on the electronic resource. The data processing system 102 can query the onsite state sharing API 146 to determine a semantic foreground state of the electronic resource 134. Thus, the voice input detected by the voice navigator and response component 150 can include a request to perform an action received from a user. Responsive to the voice-based request, the data processing system 102 can query the onsite state sharing API 146 to determine the semantic foreground state of the electronic resource 134, select an intent manifest 118, and predict or select data values based on the action 120 or link template 122 of the intent manifest.

The data processing system 102 can provide the data values to the authorization component 142. The authorization component 142 can interface with the voice navigator and response component 150 to present the data values via visual output or audio output. The authorization component 142 can interface with the voice navigator and response component 150 to obtain authorization or input via voice audio input. The authorization component 142 can pass the data values to the onsite intent execution API 144 responsive to the voice input authorizing the data values. Thus, the data processing system 102 can receive, from a voice navigator and response component 150 executed by the client computing device, data packets carrying an input audio signal detected by a sensor 152 of the client computing device 128. The data processing system 102 can identify, from the data packets, a request for a candidate data value, and provide the data value as the candidate data value responsive to the request.

The onsite intent execution API 144 can execute the action on the 3P electronic resource 134 responsive to receiving the data values. In some cases, the onsite intent execution API 144 can determine not to load a deep link if the user interface was a voice-based user interface provided by the voice navigator and response component 150, thereby reducing computing resource utilization by avoiding having to paint or load a web page on a display device 160.

Figure 2:
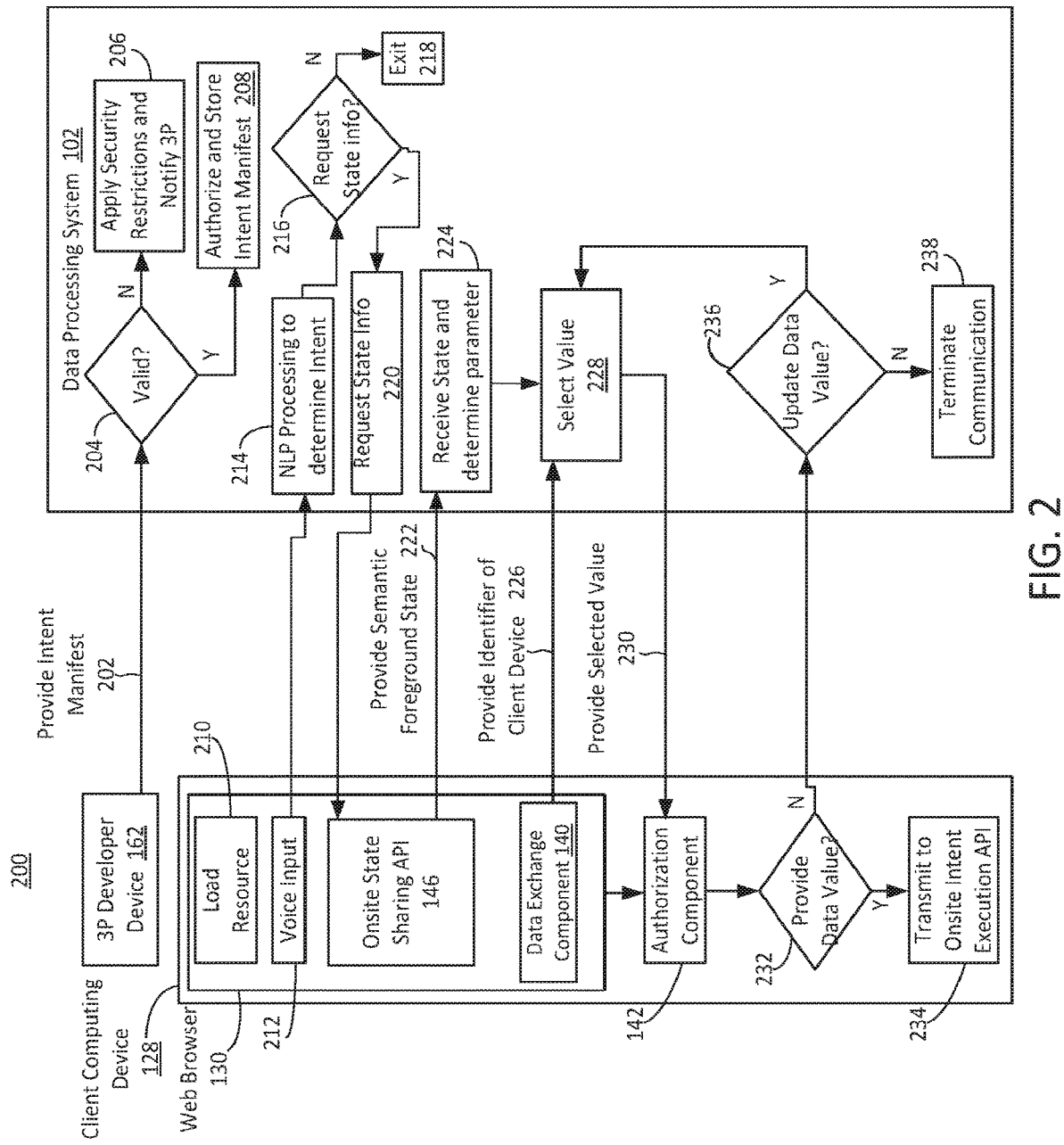
FIG. 2 is an illustration of an example operation of a system for secure digital assistant integration with web pages.

FIG. 2 is an illustration of the operation of system 200 for secure communication in web pages. The system 200 can include one or more component of system 100 depicted in FIG. 1 or system 400 depicted in FIG. 4. System 200 can include a data processing system 102. The data processing system 102 can communicate, interface with, or otherwise interact with a 3P developer device 162. At ACT 202, the data processing system can receive an intent manifest from the 3P developer device 162. The 3P developer device 162 can provide or upload the intent manifest to the data processing system 102. At ACT 204, the data processing system 102 can determine whether the intent manifest is valid. The data processing system 102 can use a validation policy to determine whether the intent manifest is valid. The validation policy can take into account types of code in the intent manifest, syntax, format, or whether the link is trusted. For example, the data processing system 102 can determine that an electronic document is invalid if it does not contain a name/value pair.

If the data processing system 102 determines the intent manifest is not valid, the data processing system 102 can apply security restrictions and notify the 3P developer device 162 at ACT 206. The data processing system 102 can generate a prompt or notification indicating that the intent manifest failed validation or is invalid. The data processing system 102 can further indicate the reasons the intent manifest is invalid and provide a suggestion as to how to resolve, fix or otherwise modify the intent manifest to make the intent manifest valid. If the data processing system 102 determines the intent manifest is valid at ACT 204, the data processing system 102 can proceed to store the intent manifest in a data repository at ACT 208.

At ACT 210, a client computing device 128 can load, in a web browser 130, an electronic resource. The electronic resource can include a web page, for example. At ACT 212, the client computing device 128 can receive voice input. A voice navigator and response component 150 can detect the voice input via a microphone or sensor of the client computing device 128. At ACT 214, the client computing device 128 can transmit data packets comprising audio input corresponding to the detected voice input to the data processing system 102. At ACT 214, the data processing system 102 can process the audio input using a natural language processing (e.g., via NLP component 106) to determine an intent.

At ACT 216, the data processing system 102 can determine whether to request state information from the electronic resource. The data processing system 102 can determine whether or not to request state info based on the intent. If the intent corresponds to an action on the electronic resource, the data processing system 102 can determine to request state info at decision block 216. If, however, the intent is not related to the electronic resource (e.g., a request to lower volume or other request unrelated to the electronic resource), the data processing system 102 can determine to exit at ACT 218.

If the data processing system 102 determines the intent relates to an action to be performed via the electronic resource, the data processing system can proceed to ACT 220 and request state information. The data processing system 102 can query an onsite state sharing API 146 to obtain semantic foreground state information. At ACT 222, the data processing system 102 can receive the semantic foreground state information from the onsite state sharing API 146.

At ACT 224, the data processing system 102 can receive the state information and determine a parameter. The data processing system 102 can access an intent manifest data structure to select an intent manifest for the electronic resource that corresponds to the state information. The intent manifest can include an action that corresponds to, or is responsive to, the intent determined at ACT 214 based on the voice input 212. The data processing system 102 can select the intent manifest, which maps actions to link templates, to identify a parameter associated with the action and link template.

At ACT 226, the data processing system 102 can receive an identifier of the client computing device 128. The data processing system 102 can receive the identifier at any point in the process. For example, the data processing system 102 can receive the identifier responsive to loading the resource at ACT 210, voice input at 212, on requesting state information at 220. At ACT 228, the data processing system 102 can use the identifier and the parameter to determine a data value. The data processing system 102 can access one or more data sources linked to the client computing device 128 or identifier to determine, predict, select or otherwise identify a candidate data value.

At ACT 230, the data processing system 102 can provide the selected or candidate data value to an authorization component 142 of the client computing device 128. The authorization component 142 can execute in an overlay in a JS library 148 that prevents the electronic resource from accessing the data value prior to authorization. The authorization component 142 can receive input (e.g., voice, keyboard, mouse, gesture, or other input) indicating whether the data value is authorized. In some cases, multiple candidate data values can be provided and a user may select one or more of the data values for input.

At decision block 232, the authorization component 142 can determine whether to provide the data value to the electronic resource. If the authorization component 142 determines that the data value is authorized, the authorization component, via the JS library 148, can provide the data value to an onsite intent execution API 234 to execute the action. The JS library can cause the onsite intent execution API 234 to fulfill the action via the electronic resource or 3P developer device 162.

If, however, the authorization component 142 determines that the data value is not authorized, the authorization component 142 can provide an indication to the data processing system 102. At decision block 236, the data processing system 102 can determine whether to update the data value responsive to the data value not being authorized by the authorization component 142. The data processing system 102 can determine to update the value if there are additional candidate values available, if the number of updates is less than a threshold number (e.g., 2, 3, 4, 5 or more), or based on a type of intent or preference of the third party developer device 162 as indicated in the electronic resource or intent manifest. If the data processing system 102 determines to update the data value, the data processing system 102 can return to ACT 228 to select another data value. If the data processing system 102 determines not to update the data value, the data processing system 102 can proceed to ACT 238 and terminate the communication.

Figure 3:
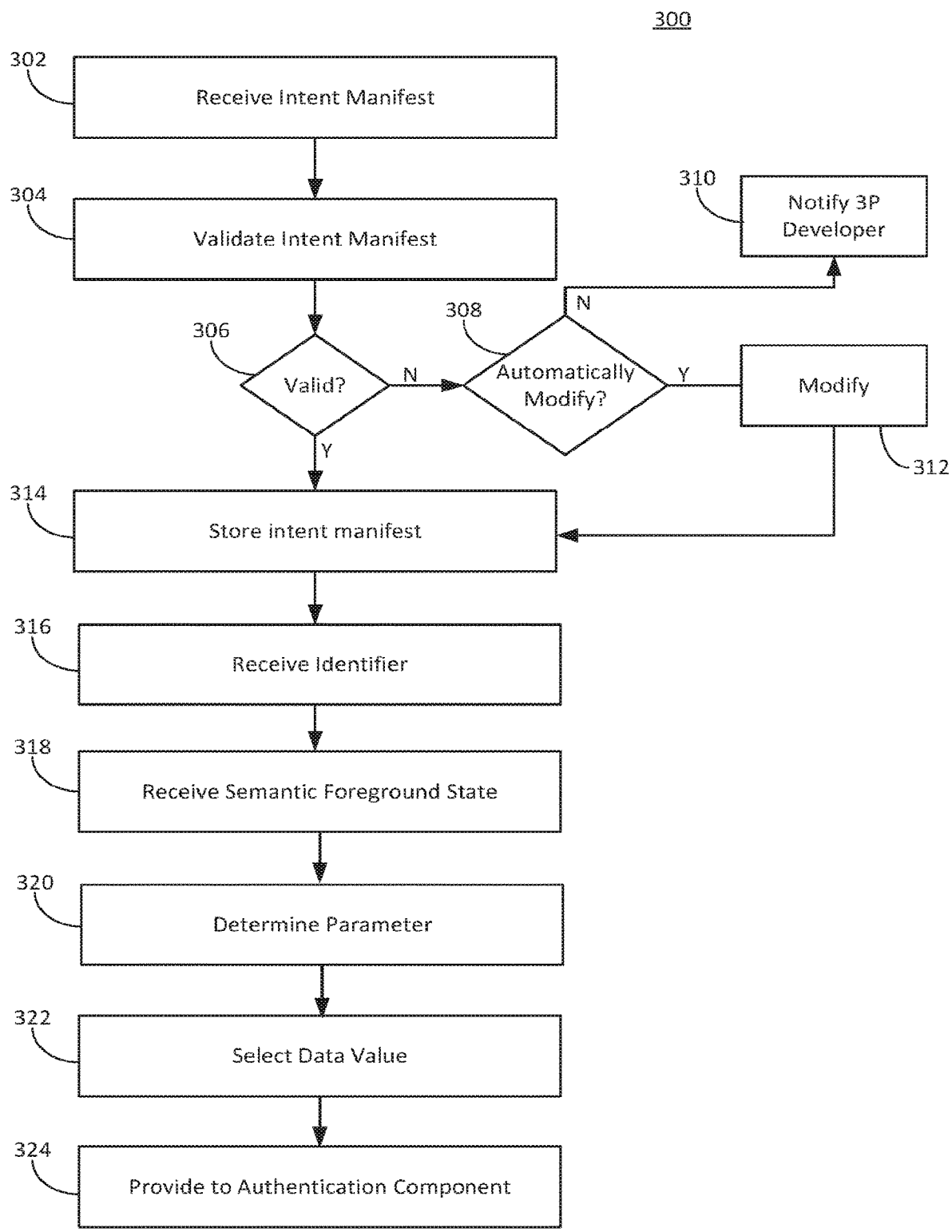
FIG. 3 is an illustration of an example method of secure digital assistant integration with web pages.

FIG. 3 is an illustration of an example method of secure communication in mobile pages. The method 300 can be performed by one or more component, system or element of system 100 depicted in FIG. 1, system 200 depicted in FIG. 2, or system 400 depicted in FIG. 4. For example, the method 300 can be performed by a data processing system. At ACT 302, the data processing system can receive an intent manifest. The data processing system can receive the intent manifest from a 3P developer device. The intent manifest can map actions to link templates, and indicate parameters used to perform the action.

At ACT 304, the data processing system can validate the intent manifest. The data processing system can validate the intent manifest using a validation policy. Validating the intent manifest can include, for example, determining whether the intent manifest includes certain types of content, code, links, or formats. The data processing system can validate the intent manifest if it does not include prohibited content, code or formats. The data processing system can invalidate the intent manifest should the intent manifest contain prohibited content, code, links or formats. By invalidating certain intent manifests, the data processing system can reduce security risks, errors, bugs, crashes on client computing devices, and wasted computing resource utilization.

If, at ACT 306, the data processing system determines the intent manifest is not valid, the data processing system can proceed to ACT 308 to determine whether to automatically modify the intent manifest. The data processing system can determine whether to automatically modify the intent manifest based on one or more factors or policies. The data processing system can determine to automatically modify the intent manifest if the 3P developer device authorized or instructed the data processing system to automatically modify intent manifests that were invalid. The data processing system can determine to automatically modify the intent manifest if the reason the intent manifest was determined invalid corresponds to an issue that the data processing system is configured to remedy. For example, if the intent manifest was invalid because of formatting or a format of the markup language, and the data processing system is configured to re-format the intent manifest to an approved format (e.g., JSON), then the data processing system can proceed to reformatting the intent manifest. The data processing system can determine to automatically modify the intent manifest if modification includes removing references to actions or parameters that are not approved. The data processing system can determine not to modify if it would entail removing aspects of the intent manifest that could result in further errors or bugs (e.g., removing a domain in the link template). The data processing system can, therefore, determine to modify the intent manifest based on the amount or type of validation failures.

If the data processing system determines not to automatically modify the intent manifest, the data processing system can proceed to ACT 310 and notify the 3P developer that the intent manifest is invalid, reasons why the intent manifest is invalid, and request the 3P developer to resolve the issues in the intent manifest.

If, at ACT 308, the data processing system determines to automatically modify the intent manifest, the data processing system can proceed to ACT 312 and modify the intent manifest. The data processing system can proceed to ACT 312 to modify the intent manifest by re-formatting the intent manifest based on the validation policy.

The data processing system can proceed to ACT 314 to store the intent manifest in a data repository of the data processing system. If, at ACT 306, the data processing system determines the intent manifest is valid based on the validation policy, the data processing system can proceed to ACT 314 to store the intent manifest in the data repository. The data processing system can store, responsive to validation of the intent manifest or modification of the intent manifest, the intent manifest in the data repository of the data processing system.

At ACT 316, the data processing system can receive an identifier of the client computing device. The identifier can correspond to an account linked with the client computing device. The account can include information or data values associated with the client computing device. The account can include data values based on historical network utilization by the client computing device. The account can include information stored by the client computing device. The account can be stored on the data processing system, or one or more external sources. The account can include information from one or more external sources or servers associated with the client computing device.

At ACT 318, the data processing system can receive semantic foreground state information. The data processing system can query an onsite state sharing API for the state information. The data processing system can query the state sharing API responsive to a request to perform an action. The data processing system can receive the state information responsive to the query.

At ACT 320, the data processing system can determine a parameter. The data processing system can select an intent manifest and identify an action and link template. The action and link template can indicate parameters. The data processing system can select data values for the parameters in the intent manifest based on the account information associated with the identifier of the client computing device at ACT 322.

At ACT 324, the data processing system can provide the data values to an authorization component of the client computing device. The authorization component can execute in an overlay on the electronic resource such that the data value is inaccessible to the electronic resource until the data value is authorized for provision to the electronic resource. The authorization component can present the data value via an overlay, prompt, notification, pop-up, iframe, or audio output. The authorization component can receive input authorizing or rejecting the data value. If the data value is authorized, the authorization component can pass the data value to the electronic resource via a JS library and an intent execution API to cause the electronic resource to execute the action based on the data value.

Figure 4:
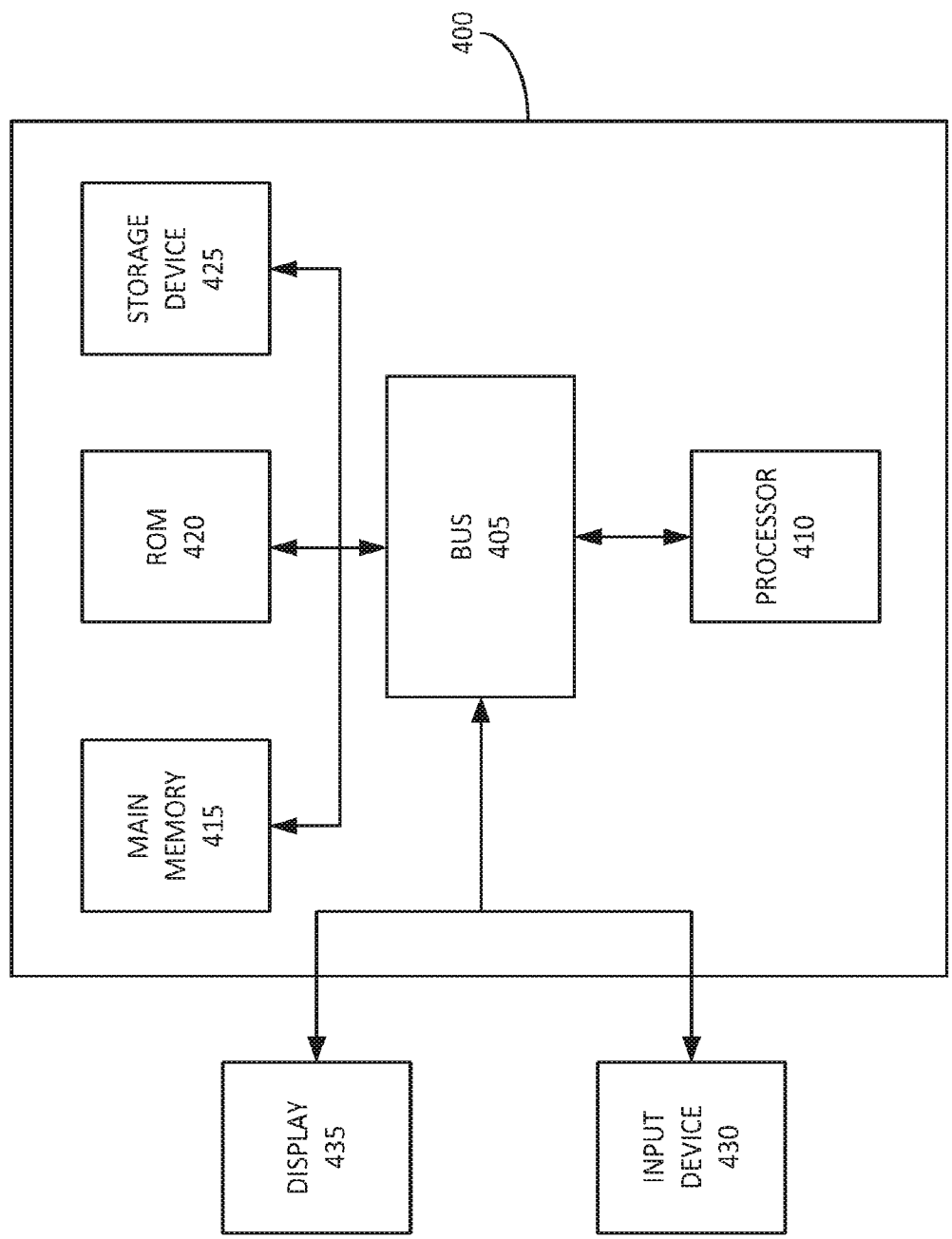
FIG. 4 is a block diagram illustrating a general architecture for a computer system that can be employed to implement elements of the systems and methods described and illustrated herein, including, for example, the systems depicted in FIGS. 1 and 2, and the method depicted in FIG. 3.

FIG. 4 is a block diagram of an example computer system 400. The computer system or computing device 400 can include or be used to implement the system 100, or its components such as the data processing system 102. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 128 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 108 or NLP component 106 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 101). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 128 or the 3P developer device 162).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 or the direct action API 108, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B,'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method implemented by one or more processors, the method comprising:
providing, by a client computing device and to a data processing system, an identifier corresponding to an account associated with the client computing device;
providing, by the client computing device and to the data processing system, data indicative of content being presented by the client computing device;
receiving, by the client computing device and from the data processing system, a data value for a parameter, the parameter being determined based on the data indicative of the content being presented by the client computing device and the data value being selected based on the identifier corresponding to the account associated with the client computing device;

generating, by the client computing device, a prompt to authorize the data value for provision to an electronic resource;

in response to the prompt, the client computing device receiving input authorizing the data value for provision to the electronic resource; and in response to receiving the input authorizing the data value for provision to the electronic resource, the client computing device providing the data value to the electronic resource to cause the electronic resource to execute an action based on the data value.

2. The method according to claim 1, wherein the parameter is further determined based on an intent manifest data structure containing a mapping between a plurality of actions of a digital assistant and a plurality of link templates of the electronic resource.

3. The method according to claim 1, wherein the electronic resource is restricted from accessing the identifier corresponding to the account associated with the client computing device, and a third-party developer device that developed the electronic resource is prohibited from accessing the identifier corresponding to the account associated with the client computing device.

4. The method according to claim 1, further comprising:
sending, by the client computing device and to the data processing system, a request;
in response to the request, the data processing system querying the client computing device for the data indicative of the content being presented by the client computing device.

5. The method according to claim 1, further comprising:
sending, by the client computing device and to the data processing system, data packets carrying an input audio signal detected by a sensor of the client computing device, the data packets causing the data processing system to identify a request for a candidate data value; and
receiving, by the client computing device and from the data processing system, the data value as the candidate data value responsive to the request.

6. The method according to claim 1, further comprising:
receiving, by an application programming interface, the data value; and
inputting, by the application programming interface, the data value into an input text box of the electronic resource.

7. The method according to claim 1, further comprising:
building a deep link with the data value; and
loading the deep link in a web browser executed by the client computing device.

8. A computer program product comprising one or more non-transitory computer-readable storage media having program instructions collectively stored on the one or more non-transitory computer-readable storage media, the program instructions executable to:
provide, by a client computing device and to a data processing system, an identifier corresponding to an account associated with the client computing device;
provide, by the client computing device and to the data processing system, data indicative of content being presented by the client computing device;
receive, by the client computing device and from the data processing system, a data value for a parameter, the parameter being determined based on the data indicative of the content being presented by the client computing device and the data value being selected based on the identifier corresponding to the account associated with the client computing device;

generate, by the client computing device, a prompt to authorize the data value for provision to an electronic resource;

in response to the prompt, receive, by the client computing device, input authorizing the data value for provision to the electronic resource; and in response to receiving the input authorizing the data value for provision to the electronic resource, provide, by the client computing device, the data value to the electronic resource to cause the electronic resource to execute an action based on the data value.

9. The computer program product according to claim 8, wherein the parameter is further determined based on an intent manifest data structure containing a mapping between a plurality of actions of a digital assistant and a plurality of link templates of the electronic resource.

10. The computer program product according to claim 8, wherein the electronic resource is restricted from accessing the identifier corresponding to the account associated with the client computing device, and a third-party developer device that developed the electronic resource is prohibited from accessing the identifier corresponding to the account associated with the client computing device.

11. The computer program product according to claim 8, wherein the program instructions are further executable to:
send, by the client computing device and to the data processing system, a request;
in response to the request, query, by the data processing system, the client computing device for the data indicative of the content being presented by the client computing device.

12. The computer program product according to claim 8, wherein the program instructions are further executable to:
send, by the client computing device and to the data processing system, data packets carrying an input audio signal detected by a sensor of the client computing device, the data packets causing the data processing system to identify a request for a candidate data value; and
receive, by the client computing device and from the data processing system, the data value as the candidate data value responsive to the request.

13. The computer program product according to claim 8, wherein the program instructions are further executable to:
receive, by an application programming interface, the data value; and
input, by the application programming interface, the data value into an input text box of the electronic resource.

14. The computer program product according to claim 8, wherein the program instructions are further executable to:
build a deep link with the data value; and
load the deep link in a web browser executed by the client computing device.

15. A system comprising:
a processor, a computer-readable memory, one or more computer-readable storage media, and program instructions collectively stored on the one or more computer-readable storage media, the program instructions executable to:
provide, by a client computing device and to a data processing system, an identifier corresponding to an account associated with the client computing device;
provide, by the client computing device and to the data processing system, data indicative of content being presented by the client computing device;

receive, by the client computing device and from the data processing system, a data value for a parameter, the parameter being determined based on the data indicative of the content being presented by the client computing device and the data value being selected based on the identifier corresponding to the account associated with the client computing device;

generate, by the client computing device, a prompt to authorize the data value for provision to an electronic resource;

in response to the prompt, receive, by the client computing device, input authorizing the data value for provision to the electronic resource; and in response to receiving the input authorizing the data value for provision to the electronic resource, provide, by the client computing device, the data value to the electronic resource to cause the electronic resource to execute an action based on the data value.

16. The system according to claim 15, wherein the parameter is further determined based on an intent manifest data structure containing a mapping between a plurality of actions of a digital assistant and a plurality of link templates of the electronic resource.

17. The system according to claim 15, wherein the electronic resource is restricted from accessing the identifier corresponding to the account associated with the client computing device, and a third-party developer device that developed the electronic resource is prohibited from accessing the identifier corresponding to the account associated with the client computing device.

18. The system according to claim 15, wherein the program instructions are further executable to:

send, by the client computing device and to the data processing system, a request;

in response to the request, query, by the data processing system, the client computing device for the data indicative of the content being presented by the client computing device.

19. The system according to claim 15, wherein the program instructions are further executable to:

send, by the client computing device and to the data processing system, data packets carrying an input audio signal detected by a sensor of the client computing device, the data packets causing the data processing system to identify a request for a candidate data value; and receive, by the client computing device and from the data processing system, the data value as the candidate data value responsive to the request.

20. The system according to claim 15, wherein the program instructions are further executable to:

receive, by an application programming interface, the data value; and input, by the application programming interface, the data value into an input text box of the electronic resource.

* * * * *